United States Patent
Anand et al.

(10) Patent No.: US 9,532,191 B2
(45) Date of Patent: Dec. 27, 2016

(54) MULTI-MODAL TRANSMISSION OF EARLY MEDIA NOTIFICATIONS

(71) Applicants: Surinder Singh Anand, Highland Park, NJ (US); Raja N. Moorthy, Fairless Hills, PA (US); Inderpal Singh Mumick, Berkely Heights, NJ (US)

(72) Inventors: Surinder Singh Anand, Highland Park, NJ (US); Raja N. Moorthy, Fairless Hills, PA (US); Inderpal Singh Mumick, Berkely Heights, NJ (US)

(73) Assignee: KIRUSA, INC., New Providence, NJ (US)

( * ) Notice: Subject to any disclaimer, the term of this patent is extended or adjusted under 35 U.S.C. 154(b) by 0 days.

(21) Appl. No.: 13/896,607

(22) Filed: May 17, 2013

(65) Prior Publication Data

US 2014/0342708 A1 Nov. 20, 2014

Related U.S. Application Data

(60) Provisional application No. 61/648,770, filed on May 18, 2012.

(51) Int. Cl.
  *H04W 4/12* (2009.01)
  *H04W 4/16* (2009.01)
  *H04M 7/12* (2006.01)

(52) U.S. Cl.
  CPC .................. *H04W 4/12* (2013.01); *H04W 4/16* (2013.01); *H04M 7/129* (2013.01)

(58) Field of Classification Search
  CPC H04M 3/42017; H04M 19/041; H04M 7/129; H04M 1/82; H04W 4/12; H04W 4/16
  USPC ............ 379/149, 201.01, 207.16, 252, 257, 418,379/911; 455/414.1
  See application file for complete search history.

(56) References Cited

U.S. PATENT DOCUMENTS

| | | | |
|---|---|---|---|
| 7,783,016 B2 | 8/2010 | Wolfman et al. | |
| 8,068,593 B2 | 11/2011 | Batni et al. | |
| 8,213,416 B2 | 7/2012 | Ravishankar et al. | |
| 2002/0176557 A1* | 11/2002 | Burger | 379/207.02 |

(Continued)

FOREIGN PATENT DOCUMENTS

| | | | |
|---|---|---|---|
| EP | WO2006074825 A1 | | 7/2006 |
| EP | 2099253 | * | 9/2009 |
| GG | WO0217602 A1 | | 2/2002 |

*Primary Examiner* — Antim Shah
(74) *Attorney, Agent, or Firm* — Ash Tankha; Lipton, Weinberger & Husick

(57) ABSTRACT

A method and system for transmitting early media notifications (EMNs) of communication services, for example, call completion, etc., is provided. A network component, a calling party device, and/or a called party device detect a call made by a calling party to a called party, and occurrence of events, for example, a call attempt, start of ringing the called party, an incomplete call, call redirection, etc. A multi-modal early media application (MMEMA) transmits one or more EMNs in more than one mode, for example, a text and audio mode for viewing and/or listening, to the calling party at any time instant, for example, immediate, during or after play of a ring back tone, prior, immediate, or after detection of an incomplete call or call redirection, etc. The MMEMA triggers billing of the calling party based on the calling party's action or a non-action after the EMNs transmission to the calling party.

29 Claims, 10 Drawing Sheets

(56) References Cited

U.S. PATENT DOCUMENTS

| | | |
|---|---|---|
| 2007/0002775 A1 | 1/2007 | Belling |
| 2007/0154005 A1* | 7/2007 | Daigle .................... 379/211.04 |
| 2007/0206577 A1 | 9/2007 | Bennett |
| 2007/0291106 A1 | 12/2007 | Kenrick et al. |
| 2007/0294411 A1 | 12/2007 | Hakkarainen |
| 2009/0022283 A1 | 1/2009 | Pollitt |
| 2009/0203365 A1 | 8/2009 | Lee et al. |
| 2009/0252153 A1 | 10/2009 | Choi et al. |
| 2009/0262908 A1* | 10/2009 | Choi et al. ..................... 379/87 |
| 2012/0076290 A1* | 3/2012 | Stifelman et al. ....... 379/207.16 |

* cited by examiner

MULTI-MODAL TRANSMISSION OF EARLY MEDIA NOTIFICATIONS

CROSS REFERENCE TO RELATED APPLICATIONS

This application claims the benefit of provisional patent application No. 61/648,770 titled "Multi-modal Early Media", filed in the United States Patent and Trademark Office on May 18, 2012.

The specification of the above referenced patent application is incorporated herein by reference in its entirety.

BACKGROUND

In a mobile communication environment, transmission of early media or a pre-call notification is a method of playing an audio message and obtaining certain inputs from a calling party during the process of setting up a voice call with a called party, before completing the voice call, so that the calling party can hear an audio message and provide inputs, for example, dual-tone multi-frequency (DTMF) signaling inputs, before the called party answers the voice call and before the calling party starts paying for the voice call, or even if the called party does not answer the voice call and the calling party does not pay for the voice call. The period between start of ringing and answering of the voice call is the period when an early media path is established between the calling party and the called party.

As mobile networks and mobile devices have evolved, text based communication and visual based communication have become an integral part of the telecommunication domain. Mobile devices have screens that display text and graphics and run applications, and mobile networks provide various data services, for example, a short message service (SMS), an unstructured supplementary service data (USSD) service, a multimedia messaging service (MMS), other data services, etc., to send and receive text and other visual information between the mobile networks and the mobile devices.

There are many voice calling systems in which a voice call made by a calling party cannot be completed with the called party answering the voice call. Such unanswered calls are also referred to as missed calls or incomplete calls. Many of these missed calls remain incomplete with the calling party having no option to complete the voice call. Some call complete solutions offer the calling party and the called party alternative methods for completing the voice calls. These call complete solutions include, for example, voice short message service (SMS) solutions and voicemail solutions that allow the calling party to record and send a voice message to the called party, and missed call solutions that send a missed call alert SMS message to the called party with the hope that the called party will make a new voice call to the calling party.

For some of the call complete solutions described above, for example, the voice SMS solutions, an audio message such as "Called party is out of coverage area" is played as early media to the calling party informing the calling party of the reason for the voice call not being completed. The early media is played before the voice call is answered and before the start of voice call billing to the calling party. Therefore, the calling party can listen to the audio message without being billed for the voice call. In some cases, the audio message played as early media also informs the calling party of the options available to complete the voice call, and instructs the calling party to take necessary actions to complete the voice call.

Furthermore, early media, for example, in the form of color ring back tones (CRBT), also referred to as caller ring back tones or caller tunes, allows the called party to customize what the calling party hears during a call attempt. Instead of a familiar ring back tone, the calling party hears the customized ring back tone message or other personalized audio content selected by the called party while the calling party waits for the voice call to be answered.

Conventionally, early media helps handle call establishment or helps provide additional information to the calling party before the call is answered. However, there are times when the calling party is not paying full attention to the audio message being played before the call is answered. This is more so with mobile devices having screens and visual displays, where the calling party is looking for visual cues indicating that an outgoing voice call has been answered or not, before paying full attention to the voice call with the aim of engaging in a voice communication with the called party. Furthermore, even when the calling party is paying full attention to the audio message being played, the calling party may be in a noisy environment, which makes it difficult to understand the audio message.

Furthermore, certain types of interactions are not possible or are cumbersome with a single mode of early media. For example, early media in the form of a color ring back tone (CRBT) that plays an audio prompt requesting a calling party to press a key to subscribe to the color ring back tone that the calling party is about to hear, detracts from the calling party's experience. A less intrusive early media message in more than one mode is therefore required. Therefore, there is a need for expanding the early media from an audio interaction, to a combination of audio, text, and visual interaction, to enhance the calling party's experience during the early media phase of a voice call, while preserving the unpaid nature of communication prior to an established voice call. To reinforce the power of the early media message being communicated to the calling party, there is a need for adding a visual mode component or a multimode component to a typical audio mode component to make the early media into multi-modal early media.

Furthermore, conventional call complete solutions require the calling party to spend about 5 seconds to about 20 seconds listening to an audio early media message to understand the status and to hear instructions on how to complete the voice call. There is a need for speeding up the interaction by providing the same or more information using multi-modal early media to the calling party in a few seconds, what would otherwise have taken 20 seconds.

Hence, there is a need for a method and a system that transmit early media notifications of one or more of multiple communication services, for example, enabling completion of an incomplete call attempt made to a called party by the calling party, providing call information to the calling party before the call is answered by the called party, etc., in more than one of multiple modes to a calling party device.

SUMMARY OF THE INVENTION

This summary is provided to introduce a selection of concepts in a simplified form that are further disclosed in the detailed description of the invention. This summary is not intended to identify key or essential inventive concepts of the claimed subject matter, nor is it intended for determining the scope of the claimed subject matter.

The method and the system disclosed herein address the above stated need for transmitting early media notifications of one or more of multiple communication services in more than one of multiple modes to a calling party device. As used herein, the term "early media" refers to media, for example, textual media, image media, audio media, video media, audiovisual media, multi-modal media, etc., or any combination thereof, that is transmitted to a calling party device during the process of setting up a call, before completion of the call, that is, before a called party answers the call. Also, as used herein, the term "calling party device" refers to a communication device of a calling party who originates a call or attempts to place a call to a called party device. Also, as used herein, the term "called party device" refers to a communication device of a called party who is a recipient or an intended recipient of a call made by the calling party. The calling party device and the called party device are, for example, mobile phones, smart phones, tablet computing devices, network enabled computing devices, etc. The communication services comprise, for example, enabling completion of a call attempt such as an incomplete call attempt, enabling completion of a redirected call, initiating a call for action, providing call information, commercial information, service information, and/or promotional information to the calling party device, transmitting advertisements to the calling party device, providing options for purchasing one or more services by performing an action on the calling party device, etc., and any combination thereof. As used herein, the term "incomplete call attempt" refers to a call attempt made by a calling party to a called party, that is not received or completed by the called party device, for example, because the called party is busy, is in an out of coverage area, is unreachable, etc., or the called party device is switched off, or the call attempt is not answered by the called party, or due to network congestion, etc. The method and the system disclosed herein provide less intrusive early media notifications in more than one mode to enable multiple types of interactions to enhance a calling party's experience.

The method and the system disclosed herein provide a multi-modal early media application executable by at least one processor configured to manage the transmission of the early media notifications of one or more communication services in more than one of the modes to the calling party device. The modes of the early media notifications comprise, for example, a text mode, an image mode, an audio mode, a video mode, an audiovisual mode, a multimedia mode, etc., and any combination thereof. One or more of the early media notifications transmitted to the calling party device in more than one of the modes comprise, for example, a ring back tone. As used herein, the term "ring back tone" refers to a sound, an audio signal, an audio indication, or a tone played to a calling party, for example, by a switching telephone network or a switching center while the calling party is waiting to be connected to the called party. The calling party hears the ring back tone until the called party answers the call. The multi-modal early media application is deployed in one or more network components and/or on an early media platform. The network component is either a first network component associated with the calling party device or a second network component associated with the called party device. As used herein, the term "early media platform" refers to an existing platform or a new platform that plays early media. The early media platform is, for example, a single mode early media platform or a multi-modal early media platform. As used herein, the term "single mode early media platform" refers to an existing platform that plays early media in a single mode, for example, an audio mode. The single mode early media platform is, for example, a voice platform that plays early media in a single mode such as an audio mode and allows completion of a call, a color ring back tone (CRBT) platform that plays a ring back tone as early media in a single mode such as an audio mode, etc. Also, as used herein, the term "color ring back tone" refers to a customized or personalized ring back tone configured or selected by the called party. The color ring back tone is, for example, a customized ring back tone message or other personalized audio content selected by the called party, which the calling party hears while the calling party waits for the voice call to be answered by the called party. Also, as used herein, the multi-modal early media platform refers to an external platform configured to play early media in multiple modes, for example, a text mode, an image mode, an audio mode, a video mode, an audiovisual mode, a multimedia mode, etc., and any combination thereof, independently or in communication with one or more of the network components and/or another early media platform. When a calling party initiates a call attempt to contact a called party, the first network component, for example, an originating switch, receives the call attempt from the calling party device to contact a called party device. The first network component routes the received call attempt to the second network component, for example, a terminating switch, to establish a communications link between the calling party device and the called party device. The second network component is either the same as the first network component or one of multiple network components excluding the first network component. One or more of the first network component, the second network component, the calling party device, and/or the called party device detect reception of the call attempt. Disclosed herein is a method for transmitting early media notifications in more than one mode for any event on or after reception of the call attempt. Disclosed herein is also a method for transmitting early media notifications in more than one mode on detection of a specific event, that is, on detection of a call attempt such as an unanswered call attempt.

The first network component, or the second network component, or the calling party device, or the called party device, or any combination thereof detects occurrence of one or more of multiple events associated with the call attempt. As used herein, the term "event" refers to an occurrence of an activity during a call attempt or during the establishment of a communications link between the calling party device and the called party device, but before the called party answers the call attempt. The events are, for example, initiation of the call attempt, start of ringing the called party, detection of a call attempt being incomplete, redirection of the call attempt, etc. A ring back tone is played during a call attempt or during the establishment of a communications link between the calling party device and the called party device, but before the called party answers the call attempt. The multi-modal early media application transmits one or more early media notifications of one or more communication services in more than one of the modes to the calling party device via a network, for example, a mobile communication network, at any time instant associated with the call attempt. In an embodiment, the multi-modal early media application simultaneously transmits one or more early media notifications of one or more communication services in more than one of the modes to the calling party device at any time instant associated with the call attempt. In another embodiment, the multi-modal early media application transmits one or more early media notifications of one or more communication services in more than one of the modes to the calling party device via the network during establishment of the communications link between the calling party device and the called party device.

In another embodiment, the multi-modal early media application transmits one or more early media notifications of one or more communication services in more than one of the modes to the calling party device at a selectable time instant of the occurrence of one or more of multiple events associated with the call attempt. The selectable time instant of the occurrence of the events associated with the call attempt comprises, for example, any one or more of: an initiation of the call attempt, a start of ringing the called party device, on an immediate play of a ring back tone, during the play of the ring back tone, after a configurable time period of the play of the ring back tone, an immediate detection of the call attempt, a redirection of the call attempt, for example, from the first network component to the second network component or from the second network component to an early media platform implementing the multi-modal early media application, on detection of an incomplete call attempt, prior to redirection of the call attempt, on an immediate detection of the redirection of the call attempt, after a configurable time period of the detection of the redirection of the call attempt, a configurable time period before completion and answering of the call attempt, etc.

The transmission of one or more early media notifications of one or more communication services in more than one of the modes to the calling party device via the network allows the calling party device to listen, feel, sense, and/or view the early media notifications on one or more modal interfaces of the calling party device, thereby enabling the calling party to obtain, for example, additional information about the call attempt. The method and the system disclosed herein also enable the calling party to take action that leads to completion of an incomplete call attempt. In an embodiment, the multi-modal early media application prompts and enables an action from the calling party during rendering of the early media notifications of the communication services in more than one of the modes on one or more modal interfaces of the calling party device. In an embodiment, the multi-modal early media application prompts the action from the calling party without billing the calling party. In another embodiment, the multi-modal early media application triggers the billing of the calling party device for one or more communication services after a lapse of a configurable time period of rendering of one or more of early media notifications of one or more communication services in more than one of the modes on one or more modal interfaces of the calling party device and the action performed by the calling party using the calling party device.

In an embodiment, the multi-modal early media application transmits one or more early media notifications of one or more communication services in more than one of the modes along with a color ring back tone (CRBT), also referred to as a caller ring back tone or a caller tune, to the calling party device via the network, at any time instant of the occurrence of the events associated with the call attempt.

In an embodiment, the second network component redirects the call attempt to an early media platform implementing the multi-modal early media application, via the network on detecting the occurrence of one or more events comprising, for example, any one or more of: the called party device being busy, or the called party device being in an out of coverage area, or the called party device being unreachable, or the called party device being switched off, or network congestion, or the call attempt not being answered by the called party device, etc. In this embodiment, the multi-modal early media application in the early media platform transmits one or more early media notifications of one or more communication services in more than one of the modes to the calling party device on an immediate detection of the redirection of the call attempt to the early media platform or after a configurable time period of the detection of the redirection of the call attempt.

In another embodiment, the multi-modal early media application selectively triggers billing of the calling party device based on an action or a non-action performed by the calling party using the calling party device during rendering of the early media notifications of one or more communication services in more than one of the modes on one or more modal interfaces of the calling party device. Billing is typically trigged by the call being answered. In another embodiment, the multi-modal early media application facilitates one or more multi-modal interactions with the calling party device during rendering of the early media notifications of one or more communication services in more than one of the modes on the modal interfaces of the calling party device, without billing the calling party device, if the calling party device performs the multi-modal interactions within a configurable time period of the rendering of the early media notifications. In another embodiment, the multi-modal early media application triggers billing of the calling party device for one or more communication services after a lapse of a configurable time period of the rendering of the early media notifications.

Disclosed herein are also a method and a system for transmitting early media notifications of one or more communication services in more than one of the modes to a calling party device on detection of an incomplete call attempt. In this method, after the second network component establishes a communications link between the calling party device and the called party device, the second network component detects the call attempt. If the called party device does not receive or answer the call attempt, the second network component detects the incomplete call attempt and redirects the incomplete call attempt to the multi-modal early media application. For example, the second network component redirects the incomplete call attempt to a voice server within the early media platform implementing the multi-modal early media application on detection of the occurrence of one or more events comprising, for example, any one or more of: the called party device being busy, or the called party device being in an out of coverage area, or the called party device being unreachable, or the called party device being switched off, or network congestion, or the call attempt not being answered by the called party device. The multi-modal early media application transmits one or more early media notifications of one or more communication services in more than one of the modes to the calling party device via a network, at any time instant of the detection of the incomplete call attempt or redirection of the call attempt. In an embodiment, the multi-modal early media application transmits one or more early media notifications of one or more communication services in more than one of the modes to the calling party device via a network, at a selectable time instant of the detection of the call attempt. The selectable time instant of the detection of the call attempt comprises, for example, any one or more of: an initiation of the call attempt, a start of ringing the called party device, an immediate detection of the incomplete call attempt, an immediate detection of a redirection of the incomplete call attempt by the second network component to a voice server within the early media platform implementing the multi-modal early media application, prior to the redirection of the incomplete call attempt, an immediate detection of the redirection of the incomplete call attempt, after a configurable time period of the detection of the redirection of the incomplete call attempt, and a configurable time period before completion and answering of the incomplete call attempt.

Disclosed herein are also a method and a system for transmitting early media notifications of one or more communication services in more than one of the modes to a calling party device on detecting occurrence of one or more events associated with a call attempt and for triggering billing of the calling party device on detection of an action or a non-action performed by the calling party using the calling party device. In this method, after the second network component establishes a communications link between the calling party device and the called party device, the first network component, the second network component, the calling party device, the called party device, or any combination thereof detects occurrence of one or more events associated with the call attempt. The multi-modal early media application transmits one or more early media notifications of one or more communication services in more than one of the modes to the calling party device via a network, at any time instant of the occurrence of the events associated with the call attempt. In an embodiment, the multi-modal early media application transmits one or more early media notifications of one or more communication services in more than one of the modes to the calling party device via a network, at a selectable time instant of the occurrence of the events associated with the call attempt. The selectable time instant of the occurrence of the events associated with the call attempt comprises, for example, an initiation of the call attempt, a start of ringing the called party device, an immediate play of a ring back tone, during the play of the ring back tone, after a configurable time period of the play of the ring back tone, a redirection of the call attempt, on detection of an incomplete call attempt, an immediate detection of the call attempt, prior to redirection of the call attempt, an immediate detection of the redirection of the call attempt, after a configurable time period of the detection of the redirection of the call attempt, a configurable time period before completion and answering of the call attempt, etc.

The multi-modal early media application detects an action or a non-action performed by the calling party using the calling party device in response to the communication services conveyed during rendering of the early media notifications on one or more modal interfaces of the calling party device. The multi-modal early media application triggers billing of the calling party device based on the action or the non-action performed by the calling party using the calling party device at a selectable time instant, for example, after a lapse of a configurable time period of the transmission of the early media notifications to the calling party device. The multi-modal early media application triggers the billing of the calling party device, for example, by answering the call attempt. The multi-modal early media application precludes the billing of the calling party device by releasing the call attempt. In an embodiment, the multi-modal early media application transmits an explicit instruction to trigger the billing of the calling party device for one or more communication services selected by the calling party using the calling party device. In another embodiment, the billing of the calling party device is triggered when the call attempt is answered by the called party device. In another embodiment, the billing of the calling party device is not triggered when the calling party device performs one or more multi-modal interactions within a configurable time period of the transmission of the early media notifications.

BRIEF DESCRIPTION OF THE DRAWINGS

The foregoing summary, as well as the following detailed description of the invention, is better understood when read in conjunction with the appended drawings. For the purpose of illustrating the invention, exemplary constructions of the invention are shown in the drawings. However, the invention is not limited to the specific methods and components disclosed herein.

DETAILED DESCRIPTION OF THE INVENTION

Figure 1:
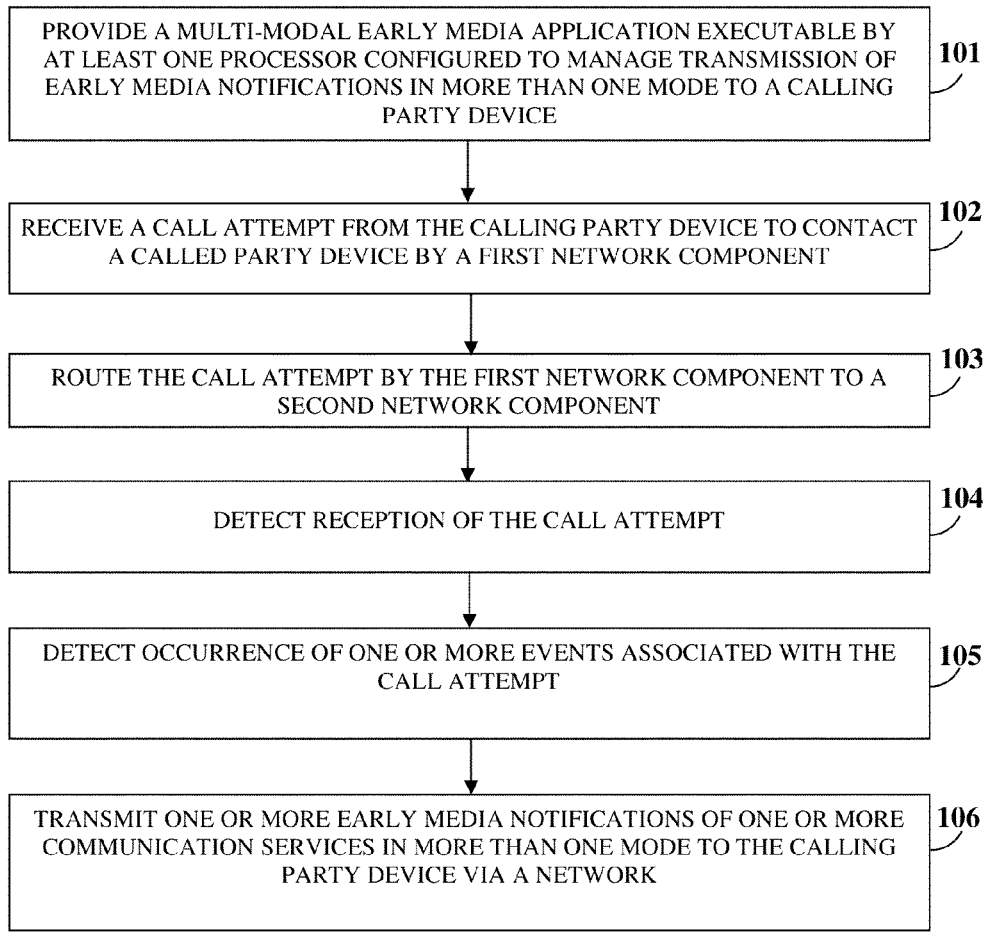
FIG. 1 illustrates a method for transmitting early media notifications of one or more communication services in more than one of multiple modes to a calling party device.

FIG. 1 illustrates a method for transmitting early media notifications of one or more communication services in more than one of multiple modes to a calling party device. The modes of the early media notifications comprise, for example, a text mode, an image mode, an audio mode, a video mode, an audiovisual mode, a multimedia mode, etc., and any combination thereof. As used herein, the term "early media" refers to media, for example, textual media, image media, audio media, video media, audiovisual media, multi-modal media, etc., or any combination thereof, that is transmitted to a calling party device during the process of setting up a call, before completion of the call, that is, before a called party answers the call. Early media comprises any media heard or viewed by a calling party during the establishment of a communications link between a calling party device and a called party device, but before the called party answers the call. One or more of the early media notifications transmitted to the calling party device in more than one of the modes comprise, for example, a ring back tone. Examples of early media are a ring back tone heard by the calling party, an announcement that the called party is not available or busy or not answering the call, etc. As used herein, the term "ring back tone" refers to a sound, an audio signal, an audio indication, or a tone played to a calling party, for example, by a switching telephone network or a switching center while the calling party is waiting to be connected to the called party. The calling party hears the ring back tone until the called party answers the call. Also, as used herein, the term "calling party device" refers to a communication device of a calling party who originates a call or attempts to place a call to a called party device. Also, as used herein, the term "called party device" refers to a communication device of a called party who is a recipient or an intended recipient of a call made by the calling party. Examples of the calling party device and the called party device are a mobile phone, a smart phone, a tablet computing device, a portable computing device, a personal digital assistant, a touch centric device, a network enabled computing device, etc. The calling party device and the called party device may also be hybrid devices that combine the functionality of multiple devices. Examples of a hybrid device comprise a cellular telephone that includes media player functionality, a gaming device that includes a wireless communications capability, a cellular telephone that includes game and electronic mail (email) functions, a portable device that receives email, supports mobile telephone calls, has music player functionality, and supports web browsing, etc. The communication services comprise, for example, enabling completion of the call attempt such as an incomplete call attempt, enabling completion of a redirected call, initiating a call for action, providing call information, commercial information, service information, and/or promotional information to the calling party device, transmitting advertisements to the calling party device, providing options for purchasing one or more services by performing an action on the calling party device, etc., and any combination thereof. As used herein, the term "incomplete call attempt" refers to a call attempt made by a calling party to a called party, that is not received or completed by the called party device, for example, because the called party is busy, is in an out of coverage area, is unreachable, etc., or the called party device is switched off, or the call attempt is not answered by the called party, or due to network congestion, etc.

The method disclosed herein provides 101 a multi-modal early media application executable by at least one processor configured to manage transmission of the early media notifications of one or more communication services in more than one of the modes to the calling party device. In an embodiment, the multi-modal early media application is deployed in one or more network components for managing transmission of the early media notifications of one or more communication services in more than one of the modes to the calling party device. The network components comprise a first network component associated with the calling party device and a second network component associated with the called party device. In another embodiment, the multi-modal early media application is deployed in an early media platform for transmitting early media notifications of one or more communication services in more than one of the modes to the calling party device. As used herein, the term "early media platform" refers to an existing platform or a new platform that plays early media. The early media platform is, for example, a single mode early media platform or a multi-modal early media platform. As used herein, the term "single mode early media platform" refers to an existing platform that plays early media in a single mode, for example, an audio mode. The single mode early media platform is, for example, a voice platform that plays early media in a single mode such as an audio mode and allows completion of a call, a color ring back tone (CRBT) platform that plays a ring back tone as early media in a single mode such as an audio mode, etc. Also, as used herein, the term "color ring back tone" refers to a customized or personalized ring back tone configured or selected by the called party. The color ring back tone is, for example, a customized ring back tone message or other personalized audio content selected by the called party, which the calling party hears while the calling party waits for the voice call to be answered by the called party. The method disclosed herein enhances an existing early media platform to support multi-modal early media. For example, if the single mode early media platform is configured to play early media in an audio mode, the method disclosed herein deploys the multi-modal early media application in the single mode early media platform to additionally play multi-modal early media. As used herein, the term "multi-modal early media" refers to early media configured in multiple modes or in any combination of multiple different modes. In another example, the multi-modal early media application enhances a voice platform that plays early media in a single mode, for example, an audio mode, to play multi-modal early media. In another example, the multi-modal early media application enhances the CRBT platform that plays a color ring back tone as early media in a single mode to play multi-modal early media. Also, as used herein, the multi-modal early media platform refers to an external platform configured to play early media in multiple modes, for example, a text mode, an image mode, an audio mode, a video mode, an audiovisual mode, a multimedia mode, etc., and any combination thereof independently or in communication with one or more of the network components and/or another early media platform. In another embodiment, the first network component or the second network component can route a call attempt received from the calling party device to contact the called party device, to the early media platform to allow the multi-modal early media application deployed in the early media platform to transmit early media notifications of one or more communication services in more than one of the modes to the calling party device.

The multi-modal early media application is implemented on a server or a network of servers. In the method disclosed herein, the first network component receives 102 a call attempt from a calling party device to contact a called party device. The first network component routes 103 the call attempt to the second network component for establishing a communications link between the calling party device and the called party device. As used herein, the terms "first network component" and "second network component" refer, for example, to a mobile switching center (MSC), a base station subsystem (BSS), a radio access network (RAN), a telephone exchange, a telephone switch, etc., serving the calling party device and the called party device respectively. The first network component is, for example, an originating switch or an originating mobile switching center (MSC) associated with the calling party device. The second network component is, for example, a terminating switch or a terminating mobile switching center (MSC) associated with the called party device. The second network component is either the same as the first network component or one of multiple network components excluding the first network component. The first network component, the second network component, the calling party device, and/or the called party device detect 104 reception of the call attempt. The multi-modal early media application deployed in either the first network component, the second network component, or the early media platform manages the call attempt at one of the following stages, for example, during the initial call attempt or after the call attempt is redirected due to the called party device being switched off, being busy, or the calling party not answering the call. The first network component, or the second network component, or the calling party device, or the called party device, or any combination thereof detects 105 occurrence of one or more of multiple events associated with the call attempt and redirects an indication of the detected occurrence to the multi-modal early media application. As used herein, the term "event" refers to an occurrence of an activity during a call attempt or during the establishment of a communications link between the calling party device and the called party device, but before the called party answers the call attempt. The events are, for example, initiation of the call attempt, start of ringing the called party, detection of a call attempt being incomplete, redirection of the call attempt, etc.

The first network component, or the second network component, or the network elements in the calling party's carrier network detect certain events and direct the call attempt to the early media platform for transmitting the early media notifications. In an embodiment, the first network component associated with the calling party device detects the occurrence of one or more events associated with the call attempt and directs the call attempt to the early media platform for transmitting the early media notifications in more than one mode to the calling party device. For example, the network component serving the calling party, that is, the first network component detects that the call to the called party is not completed and plays an early media notification from a network element in the first network component or from the multi-modal early media application deployed in the first network component to the calling party device, or routes the call to the early media platform implementing the multi-modal early media application for playing the multi-modal early media notifications in more than one mode to the calling party device.

In another embodiment, the second network component associated with the called party detects the occurrence of one or more events associated with the call attempt and directs the call attempt to the early media platform for transmitting the early media notifications in more than one mode to the calling party device. For example, the network component serving the called party, that is, the second network component detects a call attempt and redirects the call attempt to the early media platform implementing the multi-modal early media application for playing the multi-modal early media notifications in more than one mode to the calling party device. In another example, the second network component such as the mobile switching center (MSC) of the called party device detects that a call attempt is not completed and determines from a home location register (HLR) that the called party has enabled conditional call forwarding. The second network component forwards the call attempt to a number associated with an early media platform such as the call completion platform deployed with the multi-modal early media application. The second network component routes the call to the multi-modal early media application in the call completion platform, which plays the multi-modal early media notification to the calling party device.

In another embodiment, the early media platform that deploys the multi-modal early media application detects the occurrence of one or more events associated with the call attempt and directs the call attempt to the multi-modal early media application deployed thereon for transmitting the early media notifications in more than one mode to the calling party device. That is, the early media platform that deploys the multi-modal early media application detects the occurrence of one or more events associated with the call attempt and transmits the early media notifications in more than one mode to the calling party device. For example, the early media platform detects certain other events, for example, a dual tone multi-frequency (DTMF) signal sent by the calling party device by pressing a specific key or any key, or an audio command being sent by the calling party device during the early media phase, etc., and transmits the early media notifications in more than one mode to the calling party device on detecting the events.

The multi-modal early media application transmits 106 one or more early media notifications of one or more communication services in more than one of the modes, for example, a text mode, an image mode, an audio mode, a video mode, an audiovisual mode, a multimedia mode, etc., and any combination thereof, to the calling party device via a network, for example, at any time instant of the occurrence of the events associated with the call attempt. The network through which the multi-modal early media application transmits one or more early media notifications to the calling party device is a mobile communication network, for example, a global system for mobile (GSM) communications network, a code division multiple access (CDMA) network, a third generation (3G) mobile communication network, a fourth generation (4G) mobile communication network, a long-term evolution (LTE) mobile communication network, a public telephone network, a data network, etc., or a network formed from a combination of these networks. In an embodiment, the multi-modal early media application simultaneously transmits one or more early media notifications of one or more communication services in more than one of the modes to the calling party device via the network, at any time instant of the occurrence of the events associated with the call attempt.

In another embodiment, the multi-modal early media application transmits one or more early media notifications of one or more communication services in more than one of the modes to the calling party device via the network, at a selectable time instant of the occurrence of the events associated with the call attempt. The selectable time instant of the occurrence of the events associated with the call attempt comprises, for example, an initiation of the call attempt, a start of ringing the called party device, an immediate play of a ring back tone, during the play of the ring back tone, after a configurable time period of the play of the ring back tone, an immediate detection of the call attempt, a redirection of the call attempt, prior to redirection of the call attempt, an immediate detection of the redirection of the call attempt, after a configurable time period of the detection of the redirection of the call attempt, detection of an incomplete call attempt, a configurable time period before completion and answering of the call attempt, etc. For purposes of illustration, the detailed description refers to the multi-modal early media application configured to transmit early media notifications in multiple different modes at selectable time instants, for example, at an immediate play of a ring back tone, during the play of the ring back tone, after a configurable time period of the play of the ring back tone, on an initiation of a call attempt, at a start of ringing the called party device, on a redirection of the call attempt, on detection of an incomplete call attempt, etc., however the scope of the multi-modal early media application disclosed herein is not limited to the transmission of the early media notifications at the selectable time instants disclosed above, but may be extended to transmit early media notifications in more than one mode at any time instant at any point during the call attempt.

The multi-modal early media application also transmits one or more early media notifications of one or more communication services in more than one mode to the calling party device via the network during the establishment of the communications link between the calling party device and the called party device. For example, the multi-modal early media application transmits an early media notification message of an electronic commerce (e-commerce) company advertisement or marketing of a product to the calling party device via the network, for example, in a text mode and a visual mode during the establishment of the communications link between the calling party device and the called party device. In another example, the multi-modal early media application transmits an early media notification offering the calling party the option to purchase services, for example, a ring back tone service by pressing a key on the calling party device, for example, in an audio mode, a text mode, and a visual mode. In another example, the multi-modal early media application also transmits an early media notification to the calling party device via the network, informing the calling party about the terms and conditions and charges of a service in a text mode and a visual mode.

In an example, the multi-modal early media application transmits an early media notification message: "Called party is busy. Please call after sometime" in an audio mode, a text mode, and a video mode to the calling party device via the network as soon as a ring back tone is played. In another example, the multi-modal early media application transmits an early media notification message: "Called party is busy. Please call after sometime" in an audio mode, a text mode, and a video mode to the calling party device via the network when the play of the ring back tone is in progress. In another example, the multi-modal early media application transmits an early media notification message: "Called party device is out of coverage area. Please call after sometime" in an audio mode, a text mode, and a video mode to the calling party device via the network after 10 seconds of the play of the ringing tone. In another example, the multi-modal early media application transmits an early media notification message: "Called party is not answering. Please call after sometime" in an audio mode and a video mode to the calling party device via the network as soon as an incomplete call attempt is detected. In another example, the multi-modal early media application transmits an early media notification message: "Called party is not answering. Please try again later" in an audio mode, a text mode, and a video mode to the calling party device via the network as soon as the incomplete call attempt is redirected by the second network component to an early media platform implementing the multi-modal early media application. In another example, the multi-modal early media application transmits an early media notification message: "Called party is not reachable. Please try again later" in an audio mode, a text mode, and a video mode to the calling party device via the network prior to detection of the redirection of the incomplete call attempt. In another example, the multi-modal early media application transmits an early media notification message: "Called party is not answering. Please try again later" in an audio mode, a text mode, and a video mode to the calling party device via the network after 10 seconds of the detection of the redirection of the incomplete call attempt. In another example, the multi-modal early media application transmits an early media notification offering the calling party the option to purchase services, for example, a ring back tone service by pressing a key on the calling party device, in an audio mode, a text mode, and a video mode 10 seconds before completion and answering of the call attempt by the called party.

The transmission of the early media notifications of one or more communication services in more than one of the modes to the calling party device by the multi-modal early media application via the network allows the calling party to listen, feel, sense, and/or view the early media notifications on one or more modal interfaces, for example, a visual display interface, an audio interface, etc., of the calling party device. For example, when the called party does not answer the voice call made by the calling party, in addition, to hearing the early media message: "We are unavailable to answer the voice call. Please stay on the line to leave a message", the calling party also sees the early media message on his/her calling party device.

The multi-modal early media application transmits an early media notification in a video mode or the visual mode, for example, by transmitting a visual message to the calling party device, for example, using a short message service (SMS), an unstructured supplementary service data (USSD) service, etc., or by transmitting a visual message such as a pictorial message for a language impaired calling party over a data channel to the calling party device having a data connection, or by transmitting a visual message over the top (OTT) via the network. An OTT transmission of an early media notification refers to a broadband transmission of the early media notification without a service provider being involved in the control and distribution of the early media notification. In an example, the multi-modal early media application transmits an SMS message that recites "Called party device is switched off. To send a voice SMS message, press # or stay on the call. Regular voice calling charges apply" to the calling party device via the network. In another example, the multi-modal early media application transmits the SMS message, the USSD message, the visual message, etc., that recites "Called party device is switched off. To send a voice SMS message, press # or stay on the call. Regular voice calling charges apply" over the top (OTT) to the calling party device.

In an embodiment, the multi-modal early media application transmits an early media notification as a flash SMS message or a USSD message to the calling party device via the network. The flash SMS message or the USSD message appears immediately on a graphical user interface (GUI) of the calling party device and disappears after the calling party has taken a required action. The multi-modal early media application transmits the early media notifications, for example, as OTT messages using notification mechanisms provided by vendors of the calling party devices. The multi-modal early media application transmits one or more early media notifications of one or more communication services in more than one of the modes to the calling party device via the network at one or more times configurable, for example, based on inputs received from the calling party device, network parameters, etc. The multi-modal early media application, in communicative conjunction with the calling party device and the called party device and with the associated network components, transmits enhanced visual cues or multimedia cues to the calling party device.

In an embodiment, the multi-modal early media application transmits one or more early media notifications of one or more communication services in more than one of the modes along with a color ring back tone (CRBT), also referred to as a caller ring back tone or a caller tune, to the calling party device via the network, at any time instant of the occurrence of the events associated with the call attempt. In an example, the called party may select an image of a logo as a picture and a text message, for example: "Thanks for calling XXX, someone will answer your call in a short while" to be transmitted to the calling party device along with the color ring back tone selected by the called party. The multi-modal early media application then plays the color ring back tone, for example, a music clip, sound effects, jokes, news, personalized voice greetings, etc., selected by the called party as early media and transmits the image and the text message as part of the multi-modal early media notification to the calling party device.

In an embodiment, the second network component associated with the called party redirects an incomplete call attempt to an early media platform implementing the multi-modal early media application, via the network on detection of occurrence of one or more events comprising, for example, any one or more of: the called party device being busy, or the called party device being in an out of coverage area, or the called party device being unreachable, or the called party device being switched off, or network congestion, or the call attempt not being answered by the called party device. The multi-modal early media application detects the redirection of the incomplete call attempt. The multi-modal early media application transmits one or more early media notifications of one or more communication services in more than one of the modes to the calling party device, for example, on an immediate detection of the redirection of the incomplete call attempt by the second network component, or after a configurable time period of the detection of the redirection of the incomplete call attempt. In an example, when the second network component redirects the incomplete call attempt to the early media platform implementing the multi-modal early media application, the multi-modal early media application transmits a text message to the calling party device for viewing on a graphical user interface (GUI) of the calling party device as soon as an audio message: "Called party device is switched off. To send a voice SMS message, press # or stay on the call. Regular voice calling charges apply", which is rendered or played on the calling party device. In another example, when the second network component redirects the incomplete call attempt to the early media platform implementing the multi-modal early media application, the multi-modal early media application transmits a text message to the calling party device for viewing on the GUI of the calling party device after about 10 seconds of play of the audio message: "Called party device is switched off. To send a voice SMS message, press # or stay on the call. Regular voice calling charges apply", which is rendered or played on the calling party device. The transmission of the early media notifications in more than one of the modes to the calling party device, for example, enables completion of the incomplete call attempt, enables the calling party to obtain additional information about the call attempt, enables the calling party to view, feel, sense, and/or listen to advertisements or receive promotional offers, etc.

In an embodiment, an existing platform, for example, a call completion platform is modified to add support for transmitting multi-modal early media notifications. In this embodiment, the existing platform which is already configured to play audio early media notifications is enhanced to play multi-modal early media notifications. For example, in a call completion solution, the existing voice platform that plays the early media is enhanced to play multi-modal early media. The voice platform is also enhanced to implement the multi-modal early media application for playing the multi-modal early media notifications. In the case of a multi-modal early media ring back tone, the multi-modal early media notification is played by an early media platform, for example, a color ring back tone (CRBT) platform. The CRBT platform plays early media in the form of ring back tone. In this embodiment, the method disclosed herein enables the CRBT platform to be enhanced to transmit multi-modal early media notifications. In another embodiment, the call attempt is routed to an external platform for playing the multi-modal early media notifications. For example, when the early media notifications for an incomplete call are played by a network component or a switching element or another element in the calling party's carrier network, the call attempt is routed to another early media platform implementing the multi-modal early media application for transmitting the multi-modal early media notifications to the calling party device. In another embodiment, the calling party's carrier can deploy the multi-modal early media application that plays the multi-modal early media notifications and can also promote other services, for example, carrier services, other third party services, etc., in the additional modes that are provided by the multi-modal early media application while continuing to play the main message, for example, an audio early media message such as "The user you are trying to call is switched off. Please call later".

In an embodiment, the multi-modal early media application facilitates one or more multi-modal interactions with the calling party device during rendering of the early media notifications on the modal interfaces of the calling party device, without billing the calling party device, if the calling party device performs the multi-modal interactions within a configurable time period of the rendering of the early media notifications. For example, after the calling party views or listens to the early media notification message: "Called party device is switched off. To send a voice SMS message, press any key or stay on the call. Regular voice calling charges apply" on the modal interfaces of the calling party device, the calling party may press a key and skip the rest of the early media notification message within, for example, 5 seconds to about 10 seconds of the rendering of the early media notification message, without being billed, thereby saving time for the calling party and saving network resources.

In another example, the multi-modal early media application transmits a text message in a language different from the language in which the audio early media is being played with instructions to change the language if the calling party desires. For example, in a certain region, where the two most popular languages are Spanish and English, by default the multi-modal early media application plays the audio early media notification in Spanish, while transmitting another early media notification in a text mode and/or a visual mode with instructions in English to the calling party device to change the language to English. For example, in addition to an audio early media notification in Spanish, the multi-modal early media application transmits another early media notification, for example: "Currently your default language is Spanish. To change the language to English, press 1", in a text mode and/or a visual mode to the calling party device. In another example, a calling party can select a language in which the calling party wishes the audio to be played and select another language to receive the text.

In an embodiment, the multi-modal early media application transmits the early media notifications, for example, in the form of advertisements or in the form of messages for different purposes. This multi-modal interaction with the calling party can be the same as the audio interaction but the multi-modal interaction may also be different. That is, the multi-modal early media application can transmit early media notification messages in different modes for different purposes. For example, the multi-modal early media application transmits an audio early media notification message informing the calling party about the option to stay on the call to send a voice SMS message to the called party, as well as a visual early media notification message informing the calling party that he/she can press a key to subscribe to a voice SMS bundle at 5 cents per day. In another example, the multi-modal early media application transmits an early media notification message in a text and a visual mode informing the calling party about both the basic service such as stay on the call to send a voice SMS message as well as the option to sell another service by subscription.

When an option to complete the call is not available, the multi-modal early media application sends a notification in more than one mode, for example, a text notification viewable on a visual display interface of the calling party device to promote a relevant service, for example, voice SMS bundles, download of a ring back tone heard during an incomplete call attempt, etc. In an embodiment, the multi-modal early media application also sends an advertising message to the calling party device while the call is in the process of being set up, and an audio message is being played.

In an embodiment, the multi-modal early media application selectively triggers billing of the calling party device based on an action or a non-action performed by the calling party using the calling party device during rendering of the early media notifications of one or more communication services in more than one mode on the modal interfaces of the calling party device. For example, during rendering of an early media notification message: "Called party device is switched off. To send a voice SMS message, press # or stay on the call. Regular voice calling charges apply" in an audio mode and a text mode or a visual mode on the modal interfaces of the calling party device, the multi-modal early media application selectively triggers billing of the calling party device based on an action such as "pressing #" or a non-action such as "staying on the call". That is, the action that the calling party device performs or does not perform on play of the early media notifications on the calling party device determines the billing of the calling party device. In another embodiment, the multi-modal early media application triggers billing of the calling party device for one or more communication services after a lapse of the configurable time period of the rendering of the early media notifications of the communication services. For example, after playing an early media notification message for about 12 seconds to about 15 seconds and after about 2 seconds to about 3 seconds of silence, the multi-modal early media application sends an answer message (ANM) which is a signaling message indicating that the called party device has answered the call. At this point, the early media notification is replaced by a regular media connection, which completes the call and initiates billing of the call. In another embodiment, the multi-modal early media application does not trigger billing of the calling party device if the calling party performs the multi-modal interactions within a configurable time period of rendering of the early media notifications. For example, during rendering of an early media notification message: "Called party device is switched off. To send a voice SMS message, press # or stay on the call. Regular voice calling charges apply" on the modal interfaces of the calling party device, if the calling party presses # within 10 seconds of rendering of the early media notification message, the multi-modal early media application does not bill the calling party device. Furthermore, in an embodiment, in addition to sending the ANM to implicitly initiate the billing of the calling party for the voice calling charges, the multi-modal early media application can initiate an explicit charge to the calling party by sending a charging request to an intelligent network (IN) charging server. The IN charging server is implemented in an intelligent network (IN) configured for fixed and mobile telecommunication networks. The intelligent network allows operators to provide value added services in addition to standard telecommunication services such as public switched telephone network (PSTN), integrated services digital network (ISDN), global system for mobile (GSM) communications services on mobile devices.

In an embodiment, the multi-modal early media application prompts and enables an action from a calling party during rendering of the early media notifications of one or more communication services in more than one mode on the modal interfaces of the calling party device. In an embodiment, the multi-modal early media application prompts the action from the calling party without billing the calling party device. In another embodiment, the multi-modal early media application triggers billing of the calling party device for one or more communication services after a lapse of a configurable time period of rendering of one or more early media notifications of one or more communication services in more than one mode on the modal interfaces of the calling party device and the action performed by the calling party using the calling party device.

The multi-modal early media application transmits less intrusive early media notifications in more than one mode to enable certain types of interactions to enhance a calling party's experience. For example, the multi-modal early media application transmits a text or a visual early media notification message, instead of an intrusive audio early media notification message, to the calling party device via the network to request the calling party to press a key to subscribe for a service, for example, a color ring back tone (CRBT) service. Similarly, the multi-modal early media application transmits early media notifications that allow selling of other services to the calling party device in a text mode and/or a visual mode while continuing to use the audio mode for performing other actions, for example, playing a ring back tone or enabling call completion. In another example, the multi-modal early media application transmits early media notifications to the calling party device to request the calling party to press a key to complete a call and start recording a message, rather than listening to the entire early media and then recording a message. In another example, the multi-modal early media application transmits early media notifications to the calling party device to request the calling party to press a key to set the tune being played during the call attempt as the calling party's ring back tone. In another example, the multi-modal early media application transmits early media notifications to the calling party device to request the calling party to press a key to convey interest in or purchase a service being promoted or advertised or sold in one or more modes supported by the multi-modal early media application. In another example, the calling party can also provide input in the form of voice during the early media phase. If the calling party device is, for example, a smart phone, then the calling party device can run a client application that can communicate with the multi-modal early media application deployed on the first network component, or the second network component, or the early media platform playing the multi-modal early media. In such cases, the input from the calling party can include any mode capable of being supported by the smart phone client application comprising text, image, video, data, etc.

Figure 2:
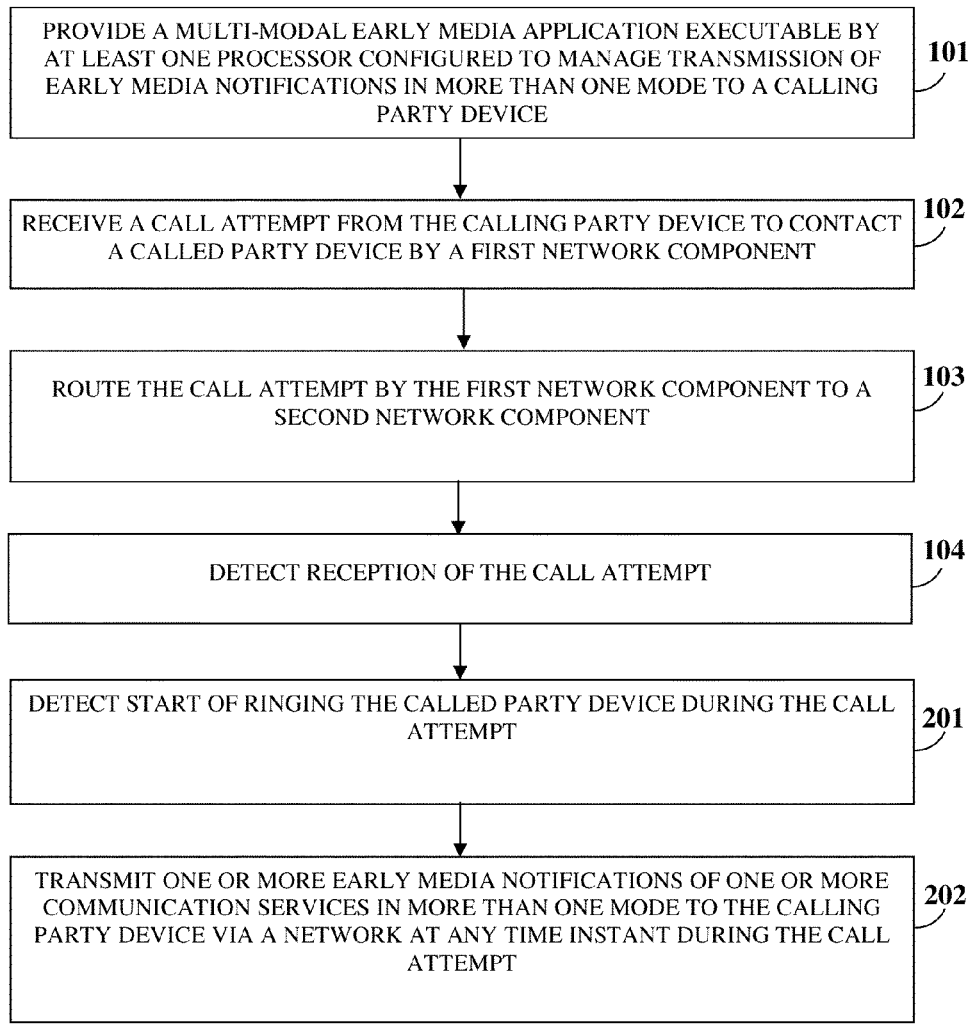
FIG. 2 illustrates a method for transmitting early media notifications of one or more communication services in more than one of multiple modes to a calling party device on detection of play of a ring back tone to the calling party device during a call attempt.

FIG. 2 illustrates a method for transmitting early media notifications of one or more communication services in more than one of multiple modes to a calling party device on detection of play of a ring back tone to the calling party device during a call attempt. The method disclosed herein comprises steps 101, 102, 103, and 104 as disclosed in the detailed description of FIG. 1. After a communications link is established between the calling party device and the called party device and the reception of the call attempt is detected, the first network component, the second network component, the calling party device, the called party device, or any combination thereof detects 201 start of ringing the calling party device during the call attempt and redirects an indication of the detected start of ringing the called party device to the multi-modal early media application. The multi-modal early media application can be deployed on the first network component, the second network component, or an early media platform. The multi-modal early media application transmits 202 one or more early media notifications of one or more communication services, for example, initiating a call for action, providing call information, providing options for purchasing one or more services by performing an action, etc., in more than one of the modes, for example, a text mode, an image mode, an audio mode, and a video mode to the calling party device via a network, at any time instant during the call attempt. In an embodiment, the multi-modal early media application transmits one or more early media notifications of one or more communication services to the calling party device via the network, at a selectable time instant of the play of the ring back tone or the ringing on the calling party device during the call attempt. The selectable time instant of the play of the ring back tone comprises, for example, an immediate play of the ring back tone, during the play of the ring back tone, after a configurable time period of the play of the ring back tone, etc. In an example, the multi-modal early media application transmits an early media notification message informing the calling party about options to subscribe to a color ring back tone (CRBT) service or to purchase a color ring back tone being heard in a text mode and a visual mode to the calling party device via the network as soon as the ring back tone is played. In another example, the multi-modal early media application transmits an early media notification message informing the calling party about options to subscribe to the CRBT service or to purchase a color ring back tone being heard in a text mode and a visual mode to the calling party device via the network when the play of the ring back tone is in progress. In another example, the multi-modal early media application transmits an early media notification message informing the calling party about options to subscribe to the CRBT service or to purchase a color ring back tone being heard in a text mode and a visual mode to the calling party device via the network after 10 seconds of the play of the ring back tone.

Figure 3:
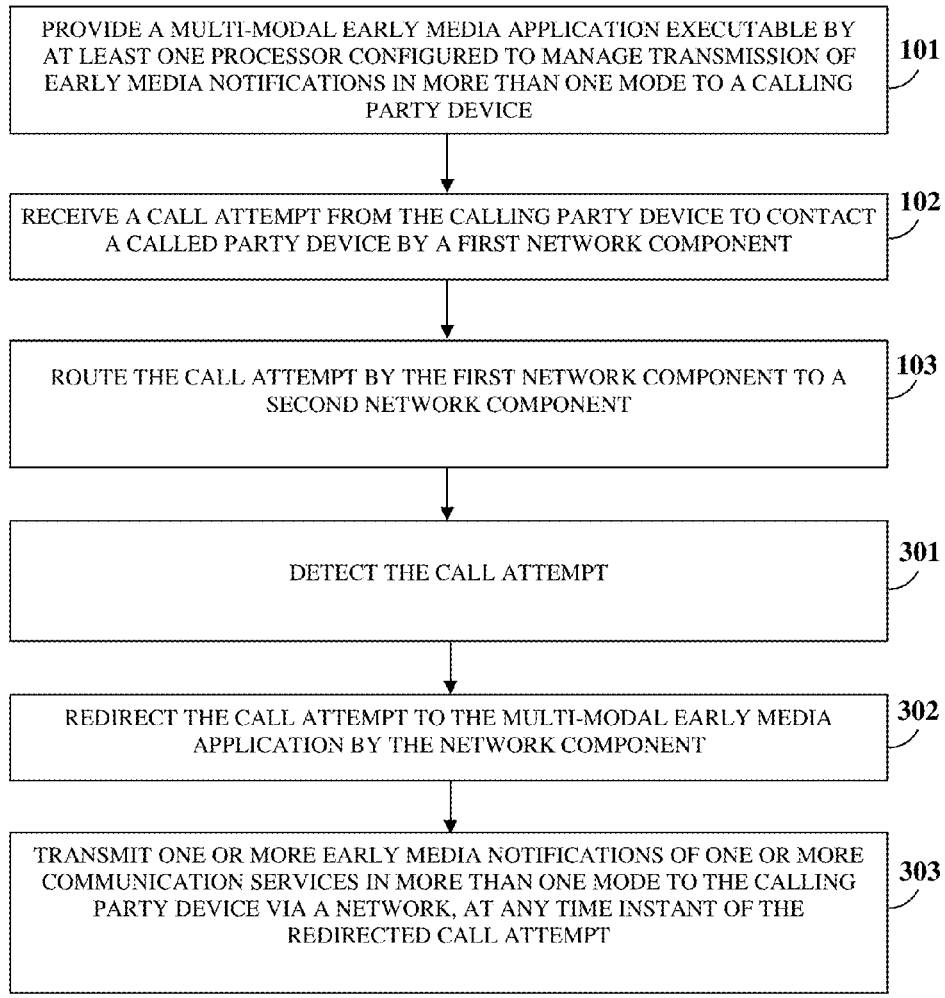
FIG. 3 illustrates a method for transmitting early media notifications of one or more communication services in more than one of multiple modes to a calling party device on detection of an incomplete call attempt.

FIG. 3 illustrates a method for transmitting early media notifications of one or more communication services in more than one of multiple modes to a calling party device on detection of an incomplete call attempt. The method disclosed herein comprises steps 101, 102, and 103 as disclosed in the detailed description of FIG. 1. After a communications link is established between the calling party device and the called party device, a network component detects 301 the call attempt and redirects 302 the call attempt to the multi-modal early media application to allow the multi-modal early media application to transmit 303 one or more early media notifications of one or more communication services in more than one mode to the calling party device via a network, at any time instant of the detection of the redirected call attempt. For example, if the called party does not answer the call attempt, the second network component detects the incomplete call attempt. In an embodiment, the second network component detects the occurrence of one or more events associated with the call attempt, for example, any one or more of: the called party device being busy, or the called party device being in an out of coverage area, or the called party device being unreachable, or the called party device being switched off, or network congestion, or the call attempt not being answered by the called party device. The second network component redirects the incomplete call attempt to the multi-modal early media application on the detection of the occurrence of the events. The multi-modal early media application can be deployed in the first network component, the second network component, or an early media platform. In this example, the second network component redirects the incomplete call attempt to a voice server in the early media platform implementing the multi-modal early media application, on detecting the occurrence of the events. For example, the second network component redirects the incomplete call attempt to the multi-modal early media application on detection of, for example, a busy ring tone, a switched off tone, etc.

The multi-modal early media application transmits one or more early media notifications of one or more communication services, for example, enabling completion of an incomplete call attempt, enabling completion of a redirected call, initiating a call for action, providing call information, providing options for purchasing one or more services by performing an action on the calling party device, etc., in more than one of the modes, for example, a text mode, an image mode, an audio mode, and a video mode to the calling party device via a network, at any time instant of the detection of the incomplete call attempt. In an embodiment, the multi-modal early media application transmits one or more early media notifications of one or more communication services in more than one mode to the calling party device via the network at a selectable time instant of the detection of the incomplete call attempt. The selectable time instant of the detection of the incomplete call attempt comprises, for example, an initiation of the call attempt, a start of the ringing the called party device, an immediate detection of the incomplete call attempt, an immediate detection of a redirection of the incomplete call attempt by the second network component to the early media platform implementing the multi-modal early media application, an immediate detection of the redirection of the incomplete call attempt to the early media platform implementing the multi-modal early media application, prior to the redirection of the incomplete call attempt, after a configurable time period of the detection of the redirection of the incomplete call attempt, and a configurable time period before completion and answering of the incomplete call attempt.

In an example, the multi-modal early media application transmits an early media notification message: "Called party device is switched off. To send a voice SMS message, press # or stay on the call. Regular voice calling charges apply" in an audio mode and a text mode to the calling party device via the network as soon as the incomplete call attempt is detected. In another example, the multi-modal early media application transmits an early media notification message: "Called party device is switched off. To send a voice SMS message, press # or stay on the call. Regular voice calling charges apply" in an audio mode and a text mode to the calling party device via the network as soon as the redirection of the incomplete call attempt by the second network component to the early media platform implementing the multi-modal early media application is detected. In another example, the multi-modal early media application transmits an early media notification message: "Called party device is switched off. To send a voice SMS message, press # or stay on the call. Regular voice calling charges apply" in an audio mode and a text mode to the calling party device via the network after 10 seconds of the detection of the redirection of the incomplete call attempt.

In another example, the multi-modal early media application transmits an early media notification message: "Called party is busy, please call after sometime" in an audio mode and visual mode to the calling party device via the network as soon as the incomplete call attempt is detected. In another example, the multi-modal early media application transmits an early media notification message: "Called party device is not reachable, please try again later" in an audio mode and visual mode to the calling party device via the network as soon as the redirection of the incomplete call attempt by the second network component to a voice server within the early media platform is detected. In another example, the multi-modal early media application transmits an early media notification message: "Called party device is not reachable, please try again later" in an audio mode and visual mode to the calling party device via the network prior to detection of the redirection of the incomplete call attempt. In another example, the multi-modal early media application transmits an early media notification message: "Called party device is not reachable, please try again later" in an audio mode and visual mode to the calling party device via the network after 10 seconds of the detection of the redirection of the incomplete call attempt.

Figure 4:
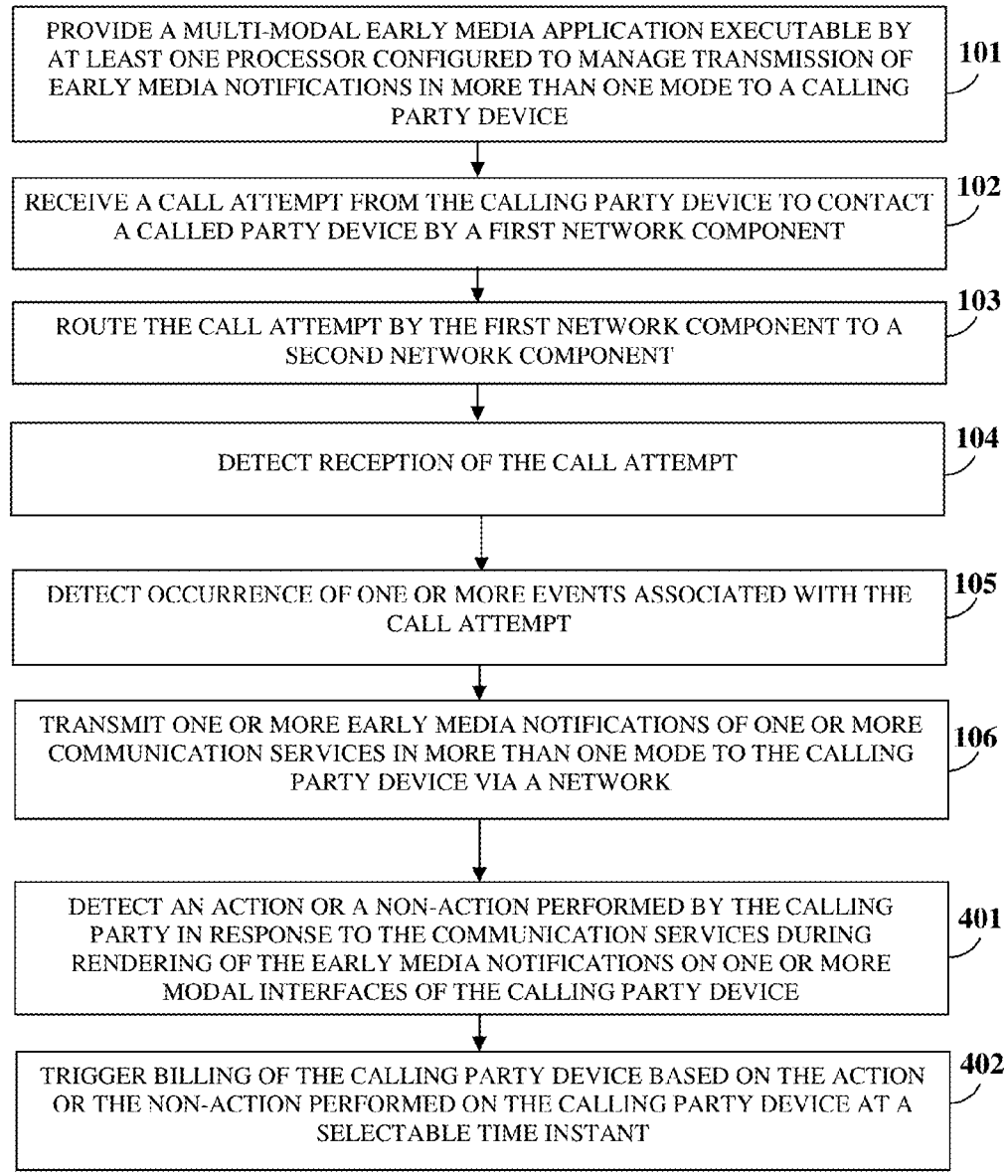
FIG. 4 illustrates a method for transmitting early media notifications of one or more communication services in more than one of multiple modes to a calling party on detection of occurrence of one or more events associated with a call attempt and for triggering billing of the calling party device on detection of an action or a non-action performed by the calling party.

FIG. 4 illustrates a method for transmitting early media notifications of one or more communication services in more than one of multiple modes to a calling party on detection of occurrence of one or more events associated with a call attempt and for triggering billing of the calling party device on detection of an action or a non-action performed by the calling party. The method disclosed herein comprises steps 101, 102, 103, and 104 as disclosed in the detailed description of FIG. 1. After a communications link is established between the calling party device and the called party device, the first network component, the second network component, the calling party device, the called party device, or any combination thereof detects 105 occurrence of one or more events associated with the call attempt. In an example, the second network component detects occurrence of one or more events associated with the call attempt and redirects an indication of the detected occurrence of the events to the multi-modal early media application. For example, the second network component detects the call attempt as incomplete and subsequently redirects the incomplete call attempt to the multi-modal early media application, for example, implemented in an early media platform. The multi-modal early media application detects the redirection of the incomplete call attempt. Similarly, the multi-modal early media application detects play of a ring back tone, start of ringing the called party device, etc. The multi-modal early media application transmits 106 one or more early media notifications of one or more communication services, for example, enabling completion of the incomplete call attempt, enabling completion of a redirected call, initiating a call for action, providing options for purchasing one or more services by performing an action on the calling party device, etc., in more than one of the modes, for example, a text mode, an image mode, an audio mode, and a video mode to the calling party device via a network, at any time instant of the occurrence of the events associated with the call attempt. For example, the multi-modal early media application transmits an early media notification of a communication service, for example, enabling completion of an incomplete call attempt in a text mode and an audio mode to the calling party device, for example, on detection of the incomplete call attempt, prior to redirection of an incomplete call attempt, on an immediate detection of the redirection of the incomplete call attempt, after a configurable time period of the detection of the redirection of the incomplete call attempt, a configurable time period before completion and answering of the incomplete call attempt, etc.

The multi-modal early media application then detects 401 an action or a non-action performed by the calling party using the calling party device in response to the communication services during rendering of the early media notifications on one or more modal interfaces of the calling party device. For example, the multi-modal early media application detects an action such as "pressing any key" or a non action such as "staying on the call" during rendering of an early media notification message: "Called party device is switched off. To send a voice SMS message, press any key or stay on the call. Regular voice calling charges apply" on the modal interfaces of the calling party device. The multi-modal early media application triggers 402 billing of the calling party device based on the action or the non-action performed by the calling party using the calling party device at a selectable time instant, for example, after a lapse of a configurable time period of the rendering of the early media notifications on the modal interfaces of the calling party device. For example, "pressing any key" to send a voice SMS message triggers billing of the calling party device after 10 seconds of play of the early media message. That is, the multi-modal early media not only serves information, but also serves as a call to action. The action that is performed or not performed by the calling party using the calling party device on play of the early media notification on the calling party device determines how the calling party device is billed. In an embodiment, the multi-modal early media application explicitly triggers billing of the calling party device for one or more communication services selected by the calling party.

The billing of the calling party device is also triggered when the call attempt is answered by the called party device. In an embodiment, the billing of the calling party device is not triggered when the calling party device performs one or more multi-modal interactions within a configurable time period of the rendering of the early media notifications on the modal interfaces of the calling party device. For example, if the calling party presses any key within 10 seconds of rendering of the early media notification message: "Called party device is switched off. To send a voice SMS message, press any key or stay on the call. Regular voice calling charges apply" the multi-modal early media application does not trigger billing of the calling party device. In an embodiment, the multi-modal early media application triggers billing of the calling party by answering the call, thereby causing the start of billing of the calling party device at regular voice call charges. The multi-modal early media application ensures that the calling party is not billed if the calling party does not want to send a message and releases the call. The multi-modal early media application precludes billing of the calling party device by releasing the call. In another embodiment, the multi-modal early media application triggers billing of the calling party by transmitting an explicit instruction to trigger billing of the calling party device for one or more communication services selected by the calling party.

Figure 5A:
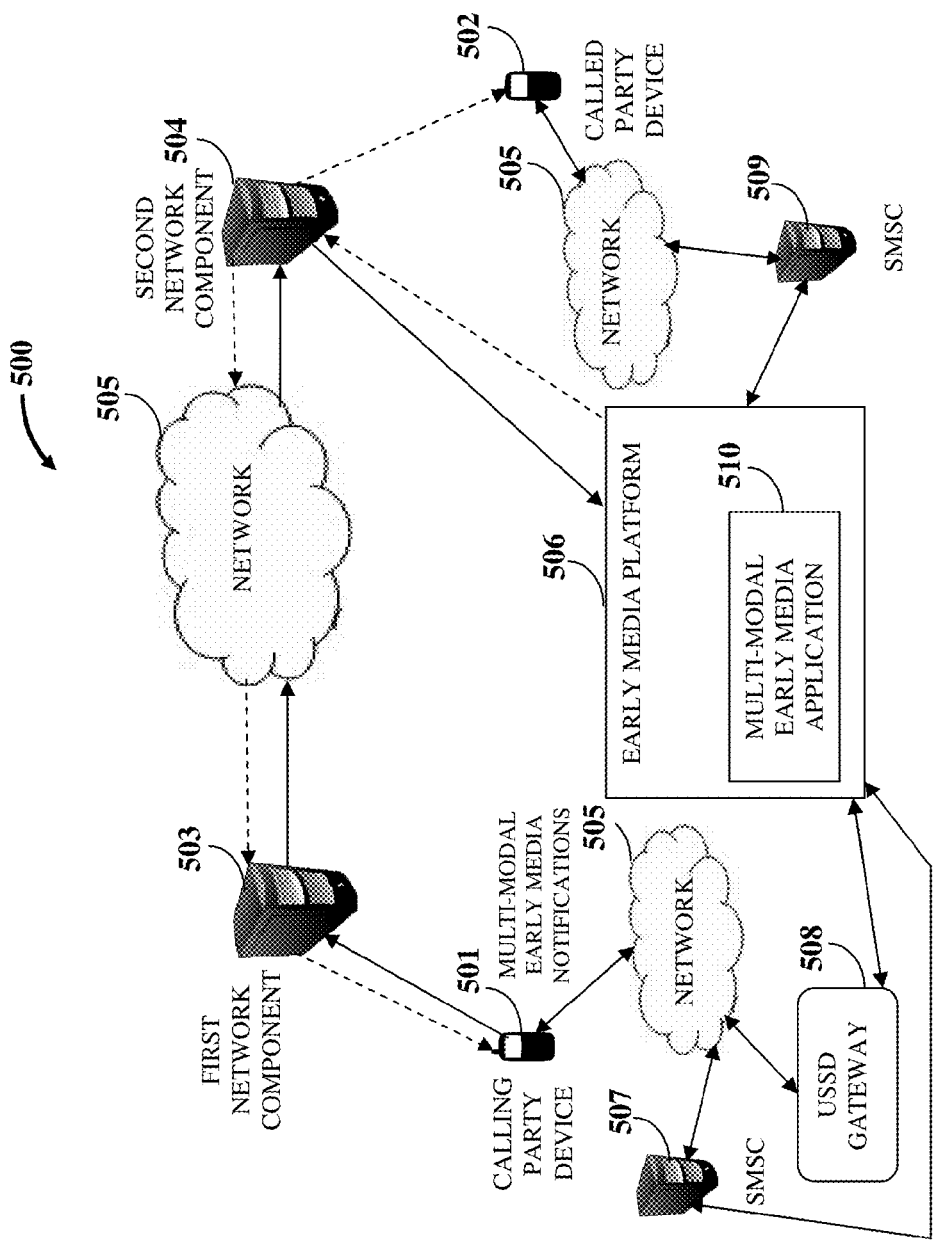
FIGS. 5A-5C exemplarily illustrate embodiments of a system showing a call flow process for transmitting early media notifications of one or more communication services in more than one of multiple modes to a calling party device.
Figure 5B:
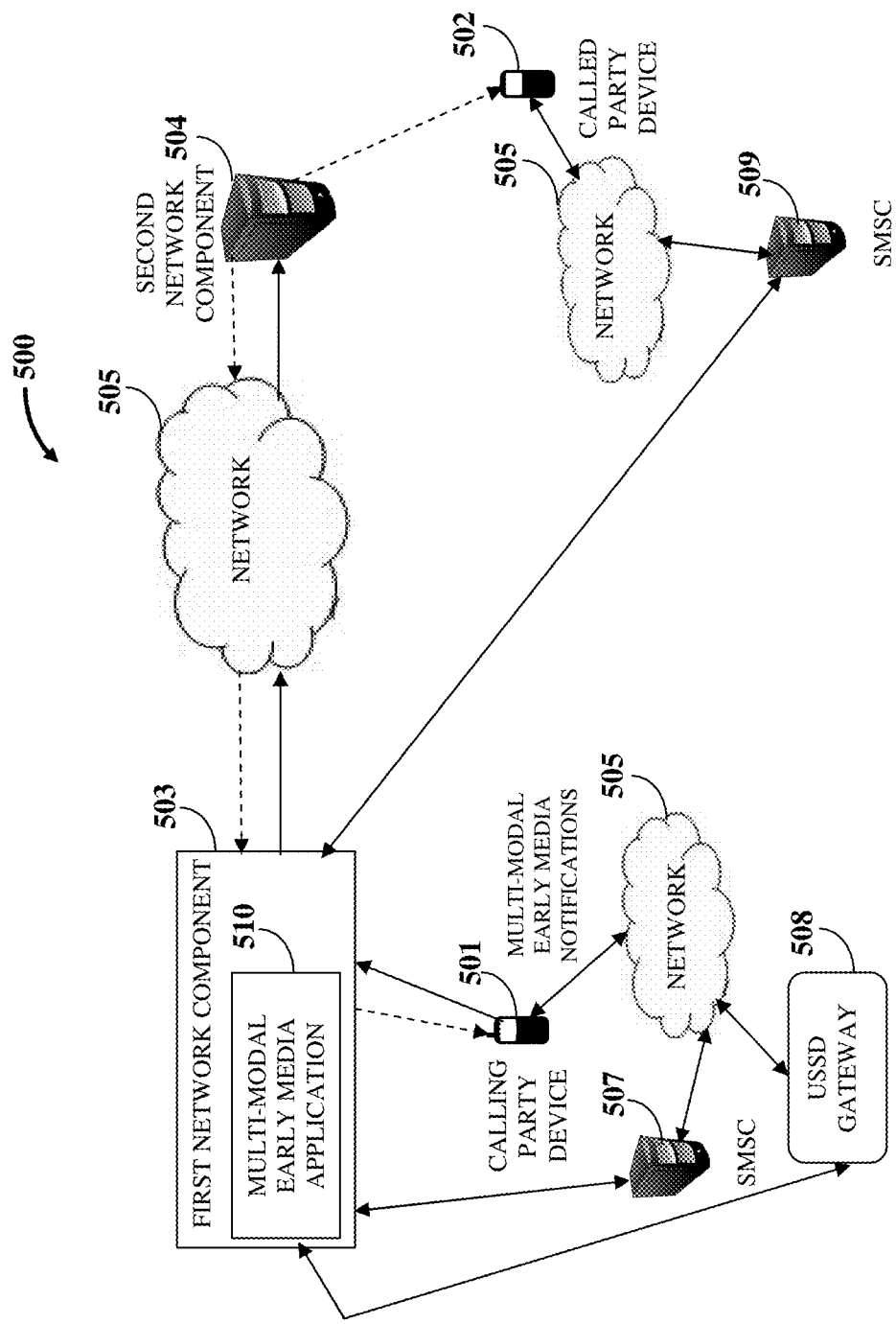
Figure 5C:
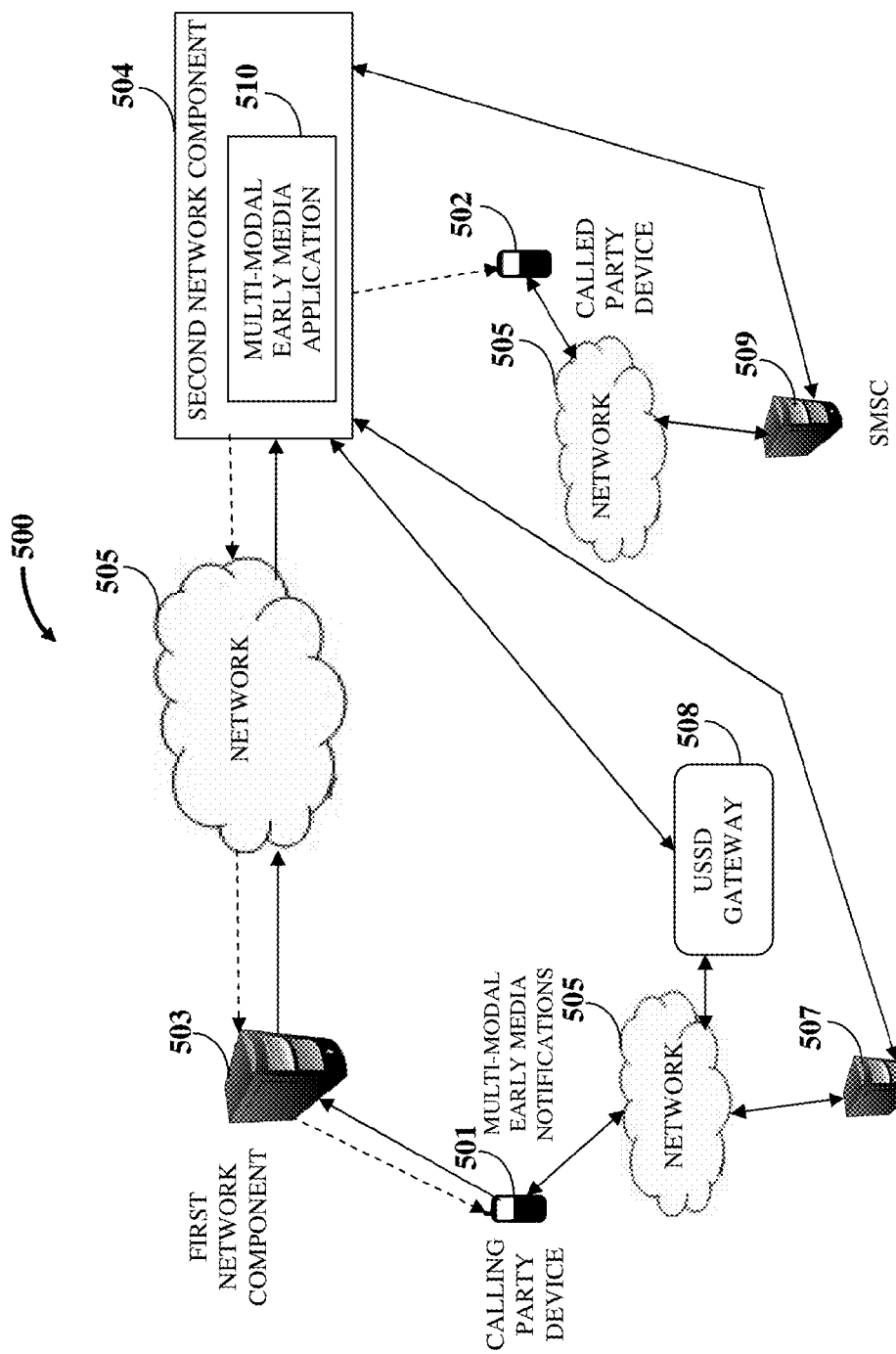

FIGS. 5A-5C exemplarily illustrate embodiments of a system 500 showing a call flow process for transmitting early media notifications of one or more communication services in more than one of multiple modes to a calling party device 501. The system 500 disclosed herein comprises a multi-modal early media application 510 deployed in the early media platform 506 as exemplarily illustrated in FIG. 5A, or in the first network component 503 as exemplarily illustrated in FIG. 5B, or in the second network component 504 as exemplarily illustrated in FIG. 5C. As exemplarily illustrated in FIG. 5A, the early media platform 506 is operably configured to communicate with the first network component 503 and the second network component 504. The first network component 503 is, for example, an originating mobile switching center (MSC). The second network component 504 is, for example, a terminating MSC. The first network component 503 communicates with the second network component 504 via a network 505. The network 505 is a telephone network and/or a data network that connects exchanges, switches, etc. The network 505 is, for example, a wired telephony network, a wireless network, a voice call network, a signaling system number 7 (SS7) network, an internet protocol data network, other data networks, etc. When a calling party attempts to make a call using a calling party device 501, for example, a mobile phone, a smart phone, a personal digital assistant (PDA), a tablet computing device, etc., to contact a called party, the calling party device 501 connects to the first network component 503. The calling party device 501 connects to the network 505 via the first network component 503.

The first network component 503 serves the calling party and receives the call attempt from the calling party device 501. The first network component 503 routes the call attempt made by the calling party to an appropriate destination based on a dialed number via the network 505. The first network component 503 routes the received call attempt to the second network component 504 via the network 505 for establishing a communications link between the calling party device 501 and the called party device 502. The called party device 502, for example, a mobile phone, a smart phone, a personal digital assistant (PDA), a tablet computing device, etc., connects to the second network component 504. The second network component 504 receives the call attempt from the first network component 503 via the network 505 and in turn routes the received call attempt to the called party device 502. The second network component 504 serves the called party and redirects calls not answered by the called party to the early media platform 506 implementing the multi-modal early media application 510.

In an embodiment, the second network component 504 redirects an incomplete call attempt to the early media platform 506. The multi-modal early media application 510 implemented in the early media platform 506 detects the redirection of the incomplete call attempt. In an embodiment, the early media platform 506 is the point of interaction of calls made to the called party and redirected by the second network component 504. The second network component 504 redirects the incomplete call attempt to the early media platform 506 due to detection of the occurrence of one or more events comprising, for example, any one or more of: the called party device 502 being busy, the called party device 502 being in an out of coverage area, the called party device 502 being unreachable, the called party device 502 being switched off, network congestion, or the call attempt not being answered by the called party device 502. If the calling party does not disconnect the voice call before a configurable time period, the call is answered and redirected to the early media platform 506.

The early media platform 506 is made aware of an incoming call at the initiation of the call attempt. The early media platform 506 interfaces with the network 505, for example, for voice messaging and signaling. The multi-modal early media application 510 in the early media platform 506 determines what early media notification including the type of mode to communicate to the calling party device 501, when to answer the call, etc. The multi-modal early media application 510 in the early media platform 506 also communicates with the network 505 directly for communications with a short message service center (SMSC) 507 or 509 or for transmission of over the top (OTT) messages. The early media platform 506 also communicates with the network 505 directly for communications with an unstructured supplementary service data (USSD) gateway 508 for transmitting USSD messages. After lapse of the configurable time period of rendering of the early media notifications, the multi-modal early media application 510 triggers billing of the calling party. The first network component 503 automatically bills the calling party at voice calling rates similar to billing if the call was answered by the called party.

In the embodiment exemplarily illustrated in FIG. 5A, the multi-modal early media application 510 transmits one or more early media notifications of one or more communication services in more than one of the modes, for example, a text mode, an image mode, an audio mode, a video mode, an audiovisual mode, a multimedia mode, etc., and any combination thereof, to the calling party device 501 via the network 505, at any time instant of the occurrence of events associated with the call attempt as disclosed in the detailed description of FIGS. 1-4. For example, the multi-modal early media application 510 transmits instructions for recording and sending a voice SMS message in an audio mode and a text message with the same instructions to the calling party device 501 via the network 505. The multi-modal early media application 510 also sends an SMS notification to the called party device 502 through the SMSC 509 via the network 505, for example, when the calling party records and sends a voice SMS message to the called party device 502. The called party retrieves and listens to the SMS notification by calling a retrieval number defined in the SMS notification. If the calling party hangs up before a configurable period of time, referred to as a timeout period, or does not send a voice SMS message, a missed call alert is sent to the called party device 502.

In an embodiment as exemplarily illustrated in FIG. 5B, the multi-modal early media application 510 is deployed in the first network component 503 associated with the calling party device 501 for managing transmission of the early media notifications of one or more communication services in more than one mode to the calling party device 501. In this embodiment, the SMSCs 507 and 509 and the USSD gateway 508 are operably connected to the first network component 503. The first network component 503 associated with the calling party device 501 detects the occurrence of one or more events associated with the call attempt, for example, an event that the called party device 502 is busy. On detecting the occurrence of the events, the multi-modal early media application 510 deployed in the first network component 503 transmits the early media notifications in more than one mode to the calling party device 501. The multi-modal early media application 510 transmits one or more early media notifications in more than one of the modes to the calling party device 501, for example, on an immediate play of a ring back tone, during the play of the ring back tone, after a configurable time period of the play of the ring back tone, on detection of an incomplete call attempt, prior to redirection of the incomplete call attempt, on an immediate detection of the redirection of the incomplete call attempt, after a configurable period of time of detection of the redirection of the incomplete call attempt, a configurable time period before completion and answering of the incomplete call attempt, etc.

In another embodiment as exemplarily illustrated in FIG. 5C, the multi-modal early media application 510 is deployed in the second network component 504 associated with the called party device 502 for managing transmission of the early media notifications of one or more communication services in more than one of the modes to the calling party device 501. In this embodiment, the SMSCs 507 and 509 and the USSD gateway 508 are operably connected to the second network component 504. In this embodiment, after a communications link is established between the calling party device 501 and the called party device 502, the second network component 504 detects an incomplete call attempt or another event. On detecting the incomplete call attempt or another event, the multi-modal early media application 510 deployed in the second network component 504 transmits one or more early media notifications in more than one of the modes to the calling party device 501.

The transmission of the early media notifications in more than one of the modes to the calling party device 501 by the multi-modal early media application 510 via the network 505 allows the calling party to listen, feel, sense, and/or view the early media notifications on one or more modal interfaces, for example, a visual display interface, an audio interface, etc., of the calling party device 501, thereby enabling completion of a call attempt, enabling the calling party to obtain additional information about the call attempt, enabling the calling party to view, feel, sense, and/or listen to advertisements or receive promotional offers of other carrier services, etc. The multi-modal early media application 510 transmits an early media notification in a video mode or a visual mode, for example, by transmitting a visual message to the calling party device 501, for example, using a short message service (SMS) through the SMSC 507, an unstructured supplementary service data (USSD) service through the USSD gateway 508, etc., via the network 505.

Figure 6:
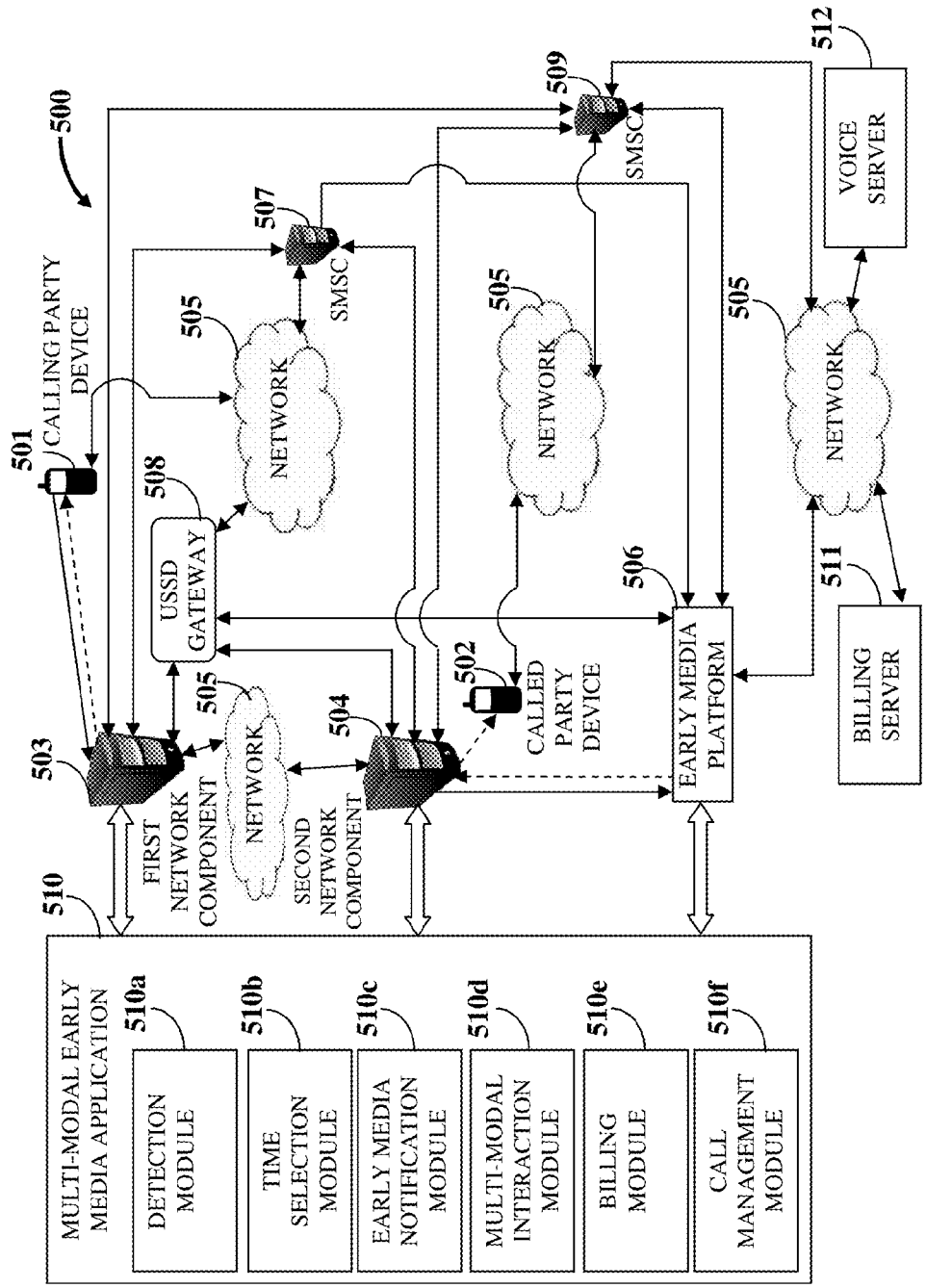
FIG. 6 exemplarily illustrates a system for transmitting early media notifications of one or more communication services in more than one of multiple modes to a calling party device.

FIG. 6 exemplarily illustrates the system 500 for transmitting early media notifications of one or more communication services in more than one of multiple modes to a calling party device 501. The communication services comprise, for example, enabling completion of a call attempt, enabling completion of a redirected call, initiating a call for action, providing one or more of call information, commercial information, service information, and promotional information to the calling party device 501, transmitting advertisements to the calling party device 501, providing options for purchasing one or more services by performing an action on the calling party device 501, etc., and any combination thereof. The system 500 disclosed herein comprises the multi-modal early media application 510 executable by at least one processor configured to manage the transmission of one or more early media notifications of one or more communication services in more than one of the modes to the calling party device 501. The multi-modal early media application 510 is deployed at one or more network components such as the first network component 503, the second network component 504, and/or on an early media platform 506 as exemplarily illustrated in FIG. 6 and as disclosed in the detailed description of FIGS. 5A-5C. A non-transitory computer readable storage medium is communicatively coupled to the processor. The non-transitory computer readable storage medium stores modules 510a, 510b, 510c, 510d, 510e, and 510f of the multi-modal early media application 510. The processor executes the modules 510a, 510b, 510c, 510d, 510e, and 510f of the multi-modal early media application 510.

The multi-modal early media application 510 comprises a detection module 510a, a time selection module 510b, an early media notification module 510c, a multi-modal interaction module 510d, a billing module 510e, and a call management module 510f. The first network component 503, or the second network component 504, or the calling party device 501, or a called party device 502, or any combination thereof detects reception of a call attempt from the calling party device 501 to contact the called party device 502. The first network component 503 routes the call attempt to the second network component 504 to establish a communications link between the calling party device 501 and the called party device 502. The second network component 504 redirects the call attempt 502 to the early media platform 506 implementing the multi-modal early media application 510 via the network 505 on detection of occurrence of one or more events comprising, for example, any one or more of: the called party device 502 being busy, or the called party device 502 being in an out of coverage area, or the called party device 502 being unreachable, or the called party device 502 being switched off, or network congestion, or the call attempt not being answered by the called party device 502, etc.

The first network component 503, the second network component 504, the calling party device 501, and/or the called party device 502 are configured to detect occurrence of one or more of multiple events associated with the call attempt received by the network component 503 or 504 from the calling party device 501 to contact the called party device 502. For example, the first network component 503, the second network component 504, the calling party device 501, and/or the called party device 502 detect play of a ring back tone to the calling party device 501 during the call attempt. The first network component 503, the second network component 504, the calling party device 501, and/or the called party device 502 further detect an incomplete call attempt redirected by the second network component 504. In an embodiment, the first network component 503 or the second network component 504 or the calling party device 501 or the called party device 502 detects occurrence of one or more events associated with the call attempt and redirects an indication of the detected occurrence to their respective multi-modal early media applications 510 or to the early media platform 506 that deploys the multi-modal early media application 510.

The early media notification module 510c transmits one or more early media notifications of one or more communication services in more than one of the modes to the calling party device 501 via the network 505, at any time instant of the occurrence of the events associated with the call attempt. In an embodiment, the early media notification module 510c transmits one or more early media notifications of the communication services in more than one of the modes to the calling party device 501 via the network 505, at a selectable time instant of the occurrence of the events associated with the call attempt. For example, the early media notification module 510c transmits one or more early media notifications of one or more communication services in more than one of the modes to the calling party device 501 on an immediate detection of the redirection of the call attempt by the network component, for example, 504 to the early media platform 506, or after a configurable time period of the detection of the redirection of the call attempt. The time selection module 510b selects the time instant of the occurrence of the events associated with the call attempt, where the time instant comprises, for example, any one or more of: an initiation of the call attempt, a start of ringing the called party device 502, an immediate play of a ring back tone, during the play of the ring back tone, after a configurable time period of the play of the ring back tone, an immediate detection of the call attempt, redirection of the call attempt, an immediate detection of an incomplete call attempt, prior to redirection of the call attempt by the second network component 504 to a voice server 512 connected to the early media platform 506 via the network 505, an immediate detection of the redirection of the call attempt, after a configurable time period of the detection of the redirection of the call attempt, and a configurable time period before completion and answering of the call attempt. The early media notification module 510c further transmits the early media notifications of one or more communication services in more than one of the modes along with a color ring back tone (CRBT), also referred to as a caller ring back tone or a caller tune, to the calling party device 501 via the network 505, at any time instant of the occurrence of the events associated with the call attempt.

The multi-modal interaction module 510d facilitates one or more multi-modal interactions with the calling party device 501 during rendering of the early media notifications on the modal interfaces of the calling party device 501, without billing the calling party device 501, if the calling party device 501 performs the multi-modal interactions within a configurable time period of the rendering of the early media notifications. The multi-modal interaction module 510d further prompts and enables an action from a calling party during rendering of one or more early media notifications of one or more communication services in more than one of the modes on one or more modal interfaces of the calling party device 501.

The detection module 510a further detects an action or a non-action performed by the calling party using the calling party device 501 in response to the communication services during rendering of the early media notifications of one or more communication services in more than one mode on one or more modal interfaces of the calling party device 501. The billing module 510e triggers the billing of the calling party device 501 via a billing server 511 for one or more communication services after a lapse of a configurable time period of rendering of the early media notifications of one or more communication services in more than one mode on one or more modal interfaces of the calling party device 501 and an action performed by the calling party using the calling party device 501. The billing server 511 is configured as an intelligent network (IN) charging server. The billing module 510e further selectively triggers billing of the calling party device 501 based on the action or the non-action performed by the calling party using the calling party device 501 at a selectable time instant of rendering of the early media notifications of one or more communication services in more than one mode on the modal interfaces of the calling party device 501, where the selectable time instant comprises, for example, any one or more of: during the rendering of the early media notifications of the communication services in more than one mode on the modal interfaces of the calling party device 501 or after a lapse of a configurable time period of the rendering of the early media notifications of the communication services in more than one mode on the modal interfaces of the calling party device 501.

The billing module 510e further does not trigger billing of the calling party device 501 when the calling party device 501 performs an action within a configurable time period of the rendering of the early media notifications of the communication services in more than one mode on the modal interfaces of the calling party device 501. The billing module 510e further triggers the billing of the calling party device 501 when the call attempt is answered by the called party device 502. In an embodiment, the billing module 510e triggers billing of the calling party device 501 by answering the call, thereby causing the start of billing the calling party device 501 at regular voice call charges. The call management module 510f answers a call attempt made by the calling party device 501 to contact the called party device 502, to trigger billing of the calling party device 501. The call management module 510f releases the call attempt to preclude billing of the calling party device 501. The call management module 510f can take the action of releasing the call to ensure that the calling party is not billed. In another embodiment, the billing module 510e triggers billing of the calling party device 501 by transmitting an explicit instruction to trigger billing of the calling party device 501 for one or more communication services selected by the calling party.

Figure 7:
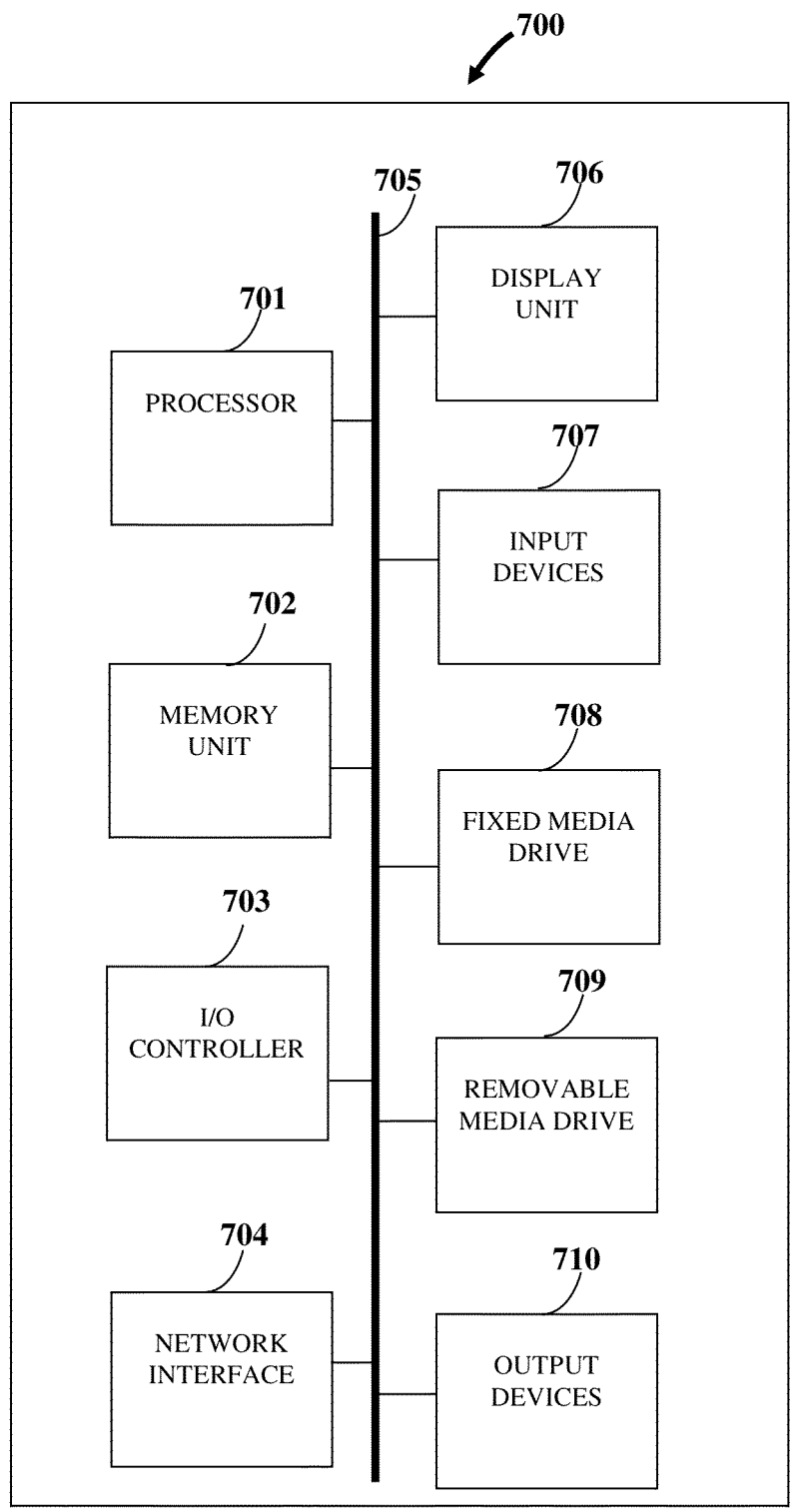
FIG. 7 exemplarily illustrates the architecture of a computer system employed by a multi-modal early media application for transmitting early media notifications of one or more communication services in more than one of multiple modes to a calling party device.

FIG. 7 exemplarily illustrates the architecture of a computer system 700 employed by the multi-modal early media application 510 for transmitting early media notifications of one or more communication services in more than one of multiple modes to a calling party device 501. The multi-modal early media application 510 of the system 500 exemplarily illustrated in FIG. 6 employs the architecture of the computer system 700 exemplarily illustrated in FIG. 7. The computer system 700 is programmable using a high level computer programming language. The computer system 700 may be implemented using programmed and purposeful hardware.

The multi-modal early media application 510 communicates with the calling party device 501 via a network 505, for example, a short range network or a long range network. The network 505 is a telephone network and/or a data network that connects exchanges, switches, etc., for example, a wired telephony network, a wireless network, a voice call network, a signaling system number 7 (SS7) network, an internet protocol data network, other data networks, etc. The computer system 700 comprises, for example, a processor 701, a memory unit 702 for storing programs and data, an input/output (I/O) controller 703, a network interface 704, a data bus 705, a display unit 706, input devices 707, a fixed media drive 708, a removable media drive 709 for receiving removable media, output devices 710, etc.

The term "processor" refers to any one or more microprocessors, central processing unit (CPU) devices, finite state machines, computers, microcontrollers, digital signal processors, logic, a logic device, an electronic circuit, an application specific integrated circuit (ASIC), a field-programmable gate array (FPGA), a chip, etc., or any combination thereof, capable of executing computer programs or a series of commands, instructions, or state transitions. The processor 701 may also be implemented as a processor set comprising, for example, a general purpose microprocessor and a math or graphics co-processor. The processor 701 is selected, for example, from the Intel® processors such as the Itanium® microprocessor or the Pentium® processors, Advanced Micro Devices (AMD®) processors such as the Athlon® processor, UltraSPARC® processors, microSPARC® processors, HP® processors, International Business Machines (IBM®) processors such as the PowerPC® microprocessor, the MIPS® reduced instruction set computer (RISC) processor of MIPS Technologies, Inc., RISC based computer processors of ARM Holdings, Motorola® processors, etc. The system 500 disclosed herein is not limited to a computer system 700 employing the processor 701. The computer system 700 may also employ a controller or a microcontroller.

The memory unit 702 is used for storing programs, applications, and data. For example, the detection module 510a, the time selection module 510b, the early media notification module 510c, the multi-modal interaction module 510d, the billing module 510e, and the call management module 510f of the multi-modal early media application 510 are stored in the memory unit 702 of the computer system 700. The memory unit 702 is, for example, a random access memory (RAM) or another type of dynamic storage device that stores information and instructions for execution by the processor 701. The memory unit 702 also stores temporary variables and other intermediate information used during execution of the instructions by the processor 701. The computer system 700 further comprises a read only memory (ROM) or another type of static storage device that stores static information and instructions for the processor 701.

The I/O controller 703 controls input actions and output actions performed by the multi-modal early media application 510. The network interface 704 enables connection of the computer system 700 to the network 505. For example, the multi-modal early media application 510 connects to the network 505 via the network interface 704. In an embodiment, the network interface 704 is provided as an interface card also referred to as a line card. The network interface 704 comprises, for example, one or more of an infrared (IR) interface, an interface implementing Wi-Fi® of the Wireless Ethernet Compatibility Alliance, Inc., a universal serial bus (USB) interface, a FireWire® interface of Apple, Inc., a Bluetooth® interface, an Ethernet interface, a frame relay interface, a cable interface, a digital subscriber line (DSL) interface, a token ring interface, a peripheral controller interconnect (PCI) interface, a local area network (LAN) interface, a wide area network (WAN) interface, interfaces using serial protocols, interfaces using parallel protocols, and Ethernet communication interfaces, asynchronous transfer mode (ATM) interfaces, a high-speed serial interface (HSSI), a fiber distributed data interface (FDDI), interfaces based on transmission control protocol (TCP)/internet protocol (IP), interfaces based on wireless communications technology such as satellite technology, radio frequency (RF) technology, near field communication, etc. The data bus 705 permits communications between the modules, for example, 510a, 510b, 510c, 510d, 510e, and 510f of the multi-modal early media application 510.

The display unit 706 displays information, display interfaces, user interface elements such as text fields, check boxes, text boxes, windows, etc., for facilitating one or more multi-modal interactions with an operator. The display unit 706 comprises, for example, a liquid crystal display, a plasma display, an organic light emitting diode (OLED) based display, etc. The input devices 707 are used for inputting data into the computer system 700. The input devices 707 are, for example, a keyboard such as an alphanumeric keyboard, a joystick, a pointing device such as a computer mouse, a touch pad, a light pen, a physical button, a pointing device, a touch sensitive display device, a track ball, a pointing stick, any device capable of sensing a tactile input, etc.

Computer applications and programs are used for operating the computer system 700. The programs are loaded onto the fixed media drive 708 and into the memory unit 702 of the computer system 700 via the removable media drive 709. In an embodiment, the computer applications and programs may be loaded directly via the network 505. Computer applications and programs are executed by double clicking a related icon displayed on the display unit 706 using one of the input devices 707. The output devices 710 output the results of operations performed by the multi-modal early media application 510. For example, the multi-modal early media application 510 displays the early media notifications of the communication services that are transmitted in more than one of the modes to the calling party device 501, etc., using the output devices 710.

The processor 701 executes an operating system, for example, the Linux® operating system, the Unix® operating system, any version of the Microsoft® Windows® operating system, the Mac OS of Apple Inc., the IBM® OS/2, VxWorks® of Wind River Systems, inc., QNX Neutrino® developed by QNX Software Systems Ltd., Palm OS®, the Solaris operating system developed by Sun Microsystems, Inc., the Android operating system, Windows Phone™ operating system of Microsoft Corporation, BlackBerry® operating system of Research in Motion Limited, the iOS operating system of Apple Inc., the Symbian® operating system of Symbian Foundation Limited, etc. The computer system 700 employs the operating system for performing multiple tasks. The operating system is responsible for management and coordination of activities and sharing of resources of the computer system 700. The operating system further manages security of the computer system 700, peripheral devices connected to the computer system 700, and network connections. The operating system employed on the computer system 700 recognizes, for example, inputs provided by an operator using one of the input devices 707, the output display, files, and directories stored locally on the fixed media drive 708, for example, a hard drive. The operating system on the computer system 700 executes different programs using the processor 701. The processor 701 and the operating system together define a computer platform for which application programs in high level programming languages are written.

The processor 701 retrieves instructions for executing the modules, for example, 510a, 510b, 510c, 510d, 510e, and 510f of the multi-modal early media application 510 from the memory unit 702. A program counter determines the location of the instructions in the memory unit 702. The program counter stores a number that identifies the current position in the program of each of the modules, for example, 510a, 510b, 510c, 510d, 510e, and 510f of the multi-modal early media application 510. The instructions fetched by the processor 701 from the memory unit 702 after being processed are decoded. The instructions are stored in an instruction register in the processor 701. After processing and decoding, the processor 701 executes the instructions. For example, the early media notification module 510c defines instructions for transmitting one or more early media notifications of one or more communication services in more than one of the modes to the calling party device 501 via the network 505. Furthermore, the early media notification module 510c defines instructions for transmitting one or more early media notifications of one or more communication services in more than one of the modes along with a color ring back tone to the calling party device 501 via the network 505, at any time instant of the occurrence of events associated with the call attempt. Furthermore, the early media notification module 510c defines instructions for transmitting one or more early media notifications of one or more communication services in more than one of the modes to the calling party device 501 on an immediate detection of a redirection of a call attempt by the network component 503 or 504 to the early media platform 506 implementing the multi-modal early media application 510 or after a configurable time period of the detection of the redirection of the call attempt.

The time selection module 510b defines instructions for selecting a time instant of the occurrence of multiple events associated with the call attempt, where the time instant comprises, for example, any one or more of: an initiation of the call attempt, a start of ringing the called party device 502, an immediate play of a ring back tone, during the play of the ring back tone, after a configurable time period of the play of the ring back tone, an immediate detection of an incomplete call attempt, an immediate detection of the call attempt, a redirection of the call attempt, prior to redirection of the call attempt, an immediate detection of the redirection of the call attempt, after a configurable time period of the detection of the redirection of the call attempt, a configurable time period before completion and answering of the call attempt, etc. The multi-modal interaction module 510d defines instructions for facilitating one or more multi-modal interactions with the calling party device 501 during rendering of the early media notifications on the modal interfaces of the calling party device 501, without billing the calling party device 501, if the calling party device 501 performs the multi-modal interactions within a configurable time period of the rendering of the early media notifications. The multi-modal interaction module 510d further defines instructions for prompting and enabling an action from a calling party during rendering of one or more early media notifications of one or more communication services in more than one of the modes on one or more modal interfaces of the calling party device 501. The detection module 510a defines instructions for detecting an action or a non-action performed by the calling party using the calling party device 501 in response to the communication services during rendering of the early media notifications of the communication services in more than one of the modes on one or more modal interfaces of the calling party device 501.

The billing module 510e defines instructions for triggering the billing of the calling party device 501 for one or more communication services after a lapse of a configurable time period of rendering of the early media notifications and/or an action performed by the calling party using the calling party device 501. Furthermore, the billing module 510e defines instructions for selectively triggering the billing of the calling party device 501 based on an action or a non-action performed by the calling party using the calling party device 501 at a selectable time instant of rendering of the early media notifications of the communication services in more than one mode on the modal interfaces of the calling party device 501. Furthermore, the billing module 510e defines instructions for not triggering billing of the calling party device 501 when the calling party device 501 performs an action within a configurable time period of the rendering of the early media notifications of the communication services in more than one mode on the modal interfaces of the calling party device 501. Furthermore, the billing module 510e defines instructions for triggering the billing of the calling party device 501 when the call attempt is answered by the called party device 502. In an embodiment, the billing module 510e defines instructions for transmitting an explicit instruction to trigger billing of the calling party device 501 for one or more communication services selected by the calling party. The call management module 510f defines instructions for answering a call attempt made by the calling party device 501 to contact the called party device 502, to trigger billing of the calling party device 501. The call management module 510f also defines instructions for releasing the call attempt to preclude billing of the calling party device 501.

The processor 701 of the computer system 700 employed by the multi-modal early media application 510 retrieves the instructions defined by the detection module 510a, the time selection module 510b, the early media notification module 510c, the multi-modal interaction module 510d, the billing module 510e, and the call management module 510f, and executes the instructions, thereby performing one or more processes defined by those instructions.

At the time of execution, the instructions stored in the instruction register are examined to determine the operations to be performed. The processor 701 then performs the specified operations. The operations comprise arithmetic operations and logic operations. The operating system performs multiple routines for performing a number of tasks required to assign the input devices 707, the output devices 710, and memory for execution of the modules, for example, 510a, 510b, 510c, 510d, 510e, and 510f of the multi-modal early media application 510. The tasks performed by the operating system comprise, for example, assigning memory to the modules, for example, 510a, 510b, 510c, 510d, 510e, and 510f of the multi-modal early media application 510, and to data used by the multi-modal early media application 510, moving data between the memory unit 702 and disk units, and handling input/output operations. The operating system performs the tasks on request by the operations and after performing the tasks, the operating system transfers the execution control back to the processor 701. The processor 701 continues the execution to obtain one or more outputs. The outputs of the execution of the modules, for example, 510a, 510b, 510c, 510d, 510e, and 510f of the multi-modal early media application 510 are displayed to an operator on the display unit 706.

For purposes of illustration, the detailed description refers to the multi-modal early media application 510 being run locally on a computer system 700; however the scope of the method and the system 500 disclosed herein is not limited to the multi-modal early media application 510 being run locally on the computer system 700 via the operating system and the processor 701, but may be extended to run remotely over the network 505 by employing a web browser and a remote server, a mobile phone, or other electronic devices. One or more portions of the computer system 700 may be distributed across one or more computer systems (not shown) coupled to the network 505.

Disclosed herein is also a computer program product comprising a non-transitory computer readable storage medium that stores computer program codes comprising instructions executable by at least one processor 701 for transmitting one or more early media notifications of one or more communication services in more than one mode to the calling party device 501. As used herein, the term "non-transitory computer readable storage medium" refers to all computer readable media, for example, non-volatile media such as optical discs or magnetic disks, volatile media such as a register memory, a processor cache, etc., and transmission media such as wires that constitute a system bus coupled to the processor 701, except for a transitory, propagating signal.

The computer program codes comprise a computer program code for transmitting one or more early media notifications of one or more communication services in more than one of the modes to the calling party device 501 via a network 505, at any time instant of the occurrence of the events associated with the call attempt comprising, for example, any one or more of: an initiation of the call attempt, a start of ringing the called party device 502, on an immediate play of a ring back tone, during the play of the ring back tone, after a configurable time period of the play of the ring back tone, detection of an incomplete call attempt, an immediate detection of a call attempt, a redirection of the call attempt, prior to redirection of the call attempt, an immediate detection of the redirection of the call attempt, after a configurable time period of the detection of the redirection of the call attempt, a configurable time period before completion and answering of the call attempt, etc. The computer program product disclosed herein further comprises one or more additional computer program codes for performing additional steps that may be required and contemplated for transmitting early media notifications of one or more communication services in more than one of multiple modes to the calling party device 501. In an embodiment, a single piece of computer program code comprising computer executable instructions performs one or more steps of the method disclosed herein for transmitting one or more early media notifications of one or more communication services in more than one of multiple modes to the calling party device 501.

The computer program codes comprising computer executable instructions are embodied on the non-transitory computer readable storage medium. The processor 701 of the computer system 700 retrieves these computer executable instructions and executes them. When the computer executable instructions are executed by the processor 701, the computer executable instructions cause the processor 701 to perform the steps of the method for transmitting one or more early media notifications of one or more communication services in more than one of multiple modes to the calling party device 501.

Figure 8:
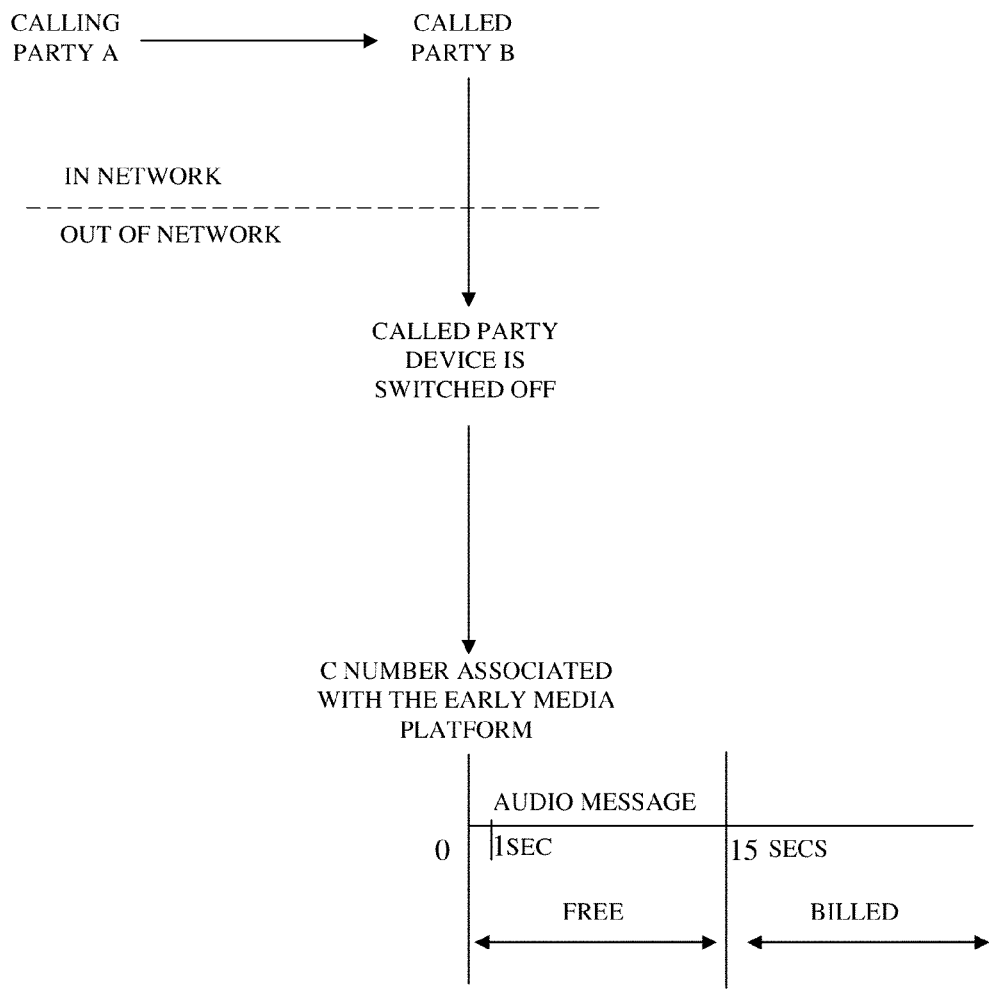
FIG. 8 exemplarily illustrates a time flow diagram, showing a time out period for billing a calling party for multi-modal interactions with the multi-modal early media application.

FIG. 8 exemplarily illustrates a time flow diagram, showing a time out period for billing a calling party for multi-modal interactions with the multi-modal early media application 510 exemplarily illustrated in FIGS. 5A-6. Consider an example where a calling party A attempts to call a called party B. If the called party B is unavailable, for example, due to the called party being busy, the called party device 502 exemplarily illustrated in FIGS. 5A-6 being switched off, the called party being in an out of coverage area, etc., the call attempt by the calling party A is redirected to an early media platform 506 exemplarily illustrated in FIG. 5A and FIG. 6 that implements the multi-modal early media application 510. The early media platform 506 is, for example, a call completion platform or a voice platform that provides voice services, for example, automatic voice short message services (AVSMS), voicemail services, etc. The second network component 504 associated with the called party device 502 diverts the call attempt to a C number, which is a call forwarding number or a translated number associated with the early media platform 506. The calling party A hears an audio message, for example: "Called party B's phone is switched off. Please leave a message" or "Stay on the call to leave a message". The audio message is followed by a short silence during which the calling party A can hang up the call if he/she is not interested in sending a voice message, and is not billed for the call. When the calling party A hears this audio message, the call is not connected to the called party device 502 and the calling party A is not billed. The calling party A may stay on the phone and start speaking and leave a message for the called party B which is saved in the early media platform 506, or the calling party A may hang up. If the calling party A decides to hang up, the calling party A is not billed. If the calling party A leaves a voice mail for the called party B, the calling party A is billed per minute and the called party B is informed by the early media platform 506 that a message was left for the called party B. If the called party B is available and answers the call, the calling party A is billed for the voice call.

If the calling party A did not hold the calling party device 501 exemplarily illustrated in FIGS. 5A-6, close to his/her ear and instead was holding the calling party device 501 in his/her hand and viewing a visual display interface or a screen of the calling party device 501, the calling party A may not hear the audio message: "Called party B's phone is switched off. Please leave a message" or "Stay on the call to leave a message" and after about 5 seconds the audio message on the calling party device 501 would announce, for example: "You must have heard the message and decided to stay on the call. Please leave a voice mail". After about 5 seconds, the early media platform 506 connects the call expecting the calling party A to leave a message for the called party B. However, the calling party A did not hear the message transmitted by the early media platform 506 to record a voice mail, since calling party A was watching the visual display interface on the calling party device 501. To address this, the early media platform 506 deploying the multi-modal early media application 510, instead of transmitting only an audio message to the calling party A, transmits an SMS text message or a visual message which reads, for example: "Called party B's phone is switched off", "Called party B is unreachable", etc., to the calling party device 501, which the calling party A can see even if the calling party A is not listening to the audio message transmitted by the early media platform 506 to the calling party device 501. The SMS text message or the visual message is displayed, for example, as soon as the audio message is played to the calling party A, during the play of the audio message, after a certain time period of the play of the audio message, etc., and serves to reinforce the message to complete the call by staying on the call. The multi-modal early media application 510 may also transmit instructions on how to speed up the process of completing the call and recording a message, to the calling party A. The calling party A is not billed for the audio message and the text message transmitted by the multi-modal early media application 510 to the calling party device 501.

If time 0 is the time when the call is received at the called party device 502, then an audio message is played on the calling party device 501 and about 15 seconds into the play of the audio message, the call connects. The 15 second period between time 0 and the time of call connection when the audio message is played is not billed, and the time downstream of the time of call connection is billed. The 15 second period is the typical time period of the early media. The time period of the audio early media varies, for example, from about 5 seconds to about 20 seconds. The multi-modal early media application 510 may also configure this time period, for example, to about 30 seconds or more. To address the problem that is caused when the calling party A is not listening to the audio message but is watching the visual display interface of the calling party device 501, the multi-modal early media application 510 transmits a text message, a video message, a visual unstructured supplementary service data (USSD) message, a visual over the top (OTT) message, or a flash SMS message to the calling party device 501. In an example, the multi-modal early media application 510 streams the video message similar to audio streaming and synchronizes the video message with the audio message. The multi-modal early media application 510 renders the other modes as and when the calling party device 501 receives the video message.

During the first one second period from time 0, the multi-modal early media application 510 transmits a text message to the calling party A which is visible to the calling party A on the visual display interface or the screen of the calling party device 501. The multi-modal interaction, that is, the voice and text interaction with the calling party A during the first fifteen seconds from time 0 where the calling party A is not billed, allows the calling party A to watch the visual display interface or the screen of the calling party device 501 and also listen to the audio message at the same time. The text information displayed on the visual display interface or the screen may also be supplemented, for example, with image content, audio content, multimedia content, etc.

The method and the system 500 disclosed herein serve the needs of calling parties who only listen to an incoming voice mail, who only watch the screen of the calling party device 501, and who listen to an incoming voice mail and watch the screen of the calling party device 501 at the same time. Furthermore, the multi-modal early media application 510 implements SMS, flash SMS, USSD, etc., over-the-top, that is, over a network 505, and text messaging over a data byte if a smart phone is being used, for the visual and text display, using Wi-Fi® of the Wireless Ethernet Compatibility Alliance, Inc., global system for mobile communications (GSM) 36 standards, code division multiple access (CDMA) mechanisms, etc. Furthermore, the multi-modal early media application 510 allows multi-modal interaction with the calling party A during the 15 second period provided to the calling party A without any billing. In an embodiment, the 15 second audio message duration can be reduced. The 15 second audio message duration varies among service providers and may extend, for example, to about 25 seconds but after this period elapses, the calling party A has to pay for the call. The multi-modal early media application 510 configures the period of time after which the calling party A has to pay. In an embodiment, the first network component 503 or the second network component 504 in the call route terminates the call if the call is not answered within a certain period of time.

In another example, when the calling party A calls the called party B, in addition to a ring back tone being played instead of the phone ringing, the multi-modal early media application 510 enables transmission and display of, for example, text, a cartoon, an image, a photograph of a person, etc., on the visual display interface or screen of the calling party device 501. For example, an early media audio message such as a song by Madonna could be playing and the early media text message transmitted may read, for example: "To buy Madonna's song as your ring tone, press any key".

Consider another example where a color ring back tone (CRBT) service is provided to the calling party. The calling party hears a color ring back tone that is specific to the called party and typically selected by the called party. The color ring back tone is played as early media. The early media platform 506 that deploys the multi-modal early media application 510 plays the CRBT to the calling party along with a visual early media notification on the calling party device 501. In addition to playing the audio media selected by the called party as early media, the multi-modal early media application 510 transmits a text message, a picture, or a video as part of the multi-modal early media notification. The other parts of the multi-modal early media played to the calling party can be selected by the called party, or can be specified by the multi-modal early media application 510.

Consider an example of transmitting multi-modal early media along with a CRBT. A business user may select audio media introducing a company while a calling party makes a call attempt to the business user. With the multi-modal early media of the multi-modal early media application 510, the business user will be able to add an image of a logo as a picture and a text message, for example: "Thanks for calling XXX, someone will answer your call in a short while". Some CRBT solutions allow the calling party to press a dual-tone multi-frequency (DTMF) key to select and/or download a song or any audio content that is playing as a ring back tone of the called party as their own ring back tone. This announcement is typically played before the start of the song selected by the called party. With multi-modal early media of the multi-modal early media application 510, selecting and/or downloading of the song, for example, is performed by sending a visual message, for example: "You can select the song that you are hearing as your own ring back tone for a one time fee of $0.99. To select, press 1", to the calling party device 501.

It will be readily apparent that the various methods, algorithms, and computer programs disclosed herein may be implemented on computer readable media appropriately programmed for general purpose computers and computing devices. As used herein, the term "computer readable media" refers to non-transitory computer readable media that participate in providing data, for example, instructions that may be read by a computer, a processor or a similar device. Non-transitory computer readable media comprise all computer readable media, for example, non-volatile media, volatile media, and transmission media, except for a transitory, propagating signal. Non-volatile media comprise, for example, optical discs or magnetic disks and other persistent memory volatile media including a dynamic random access memory (DRAM), which typically constitutes a main memory. Volatile media comprise, for example, a register memory, a processor cache, a random access memory (RAM), etc. Transmission media comprise, for example, coaxial cables, copper wire, fiber optic cables, modems, etc., including wires that constitute a system bus coupled to a processor, etc. Common forms of computer readable media comprise, for example, a floppy disk, a flexible disk, a hard disk, magnetic tape, a laser disc, a Blu-ray Disc®, any magnetic medium, a compact disc-read only memory (CD-ROM), a digital versatile disc (DVD), any optical medium, a flash memory card, punch cards, paper tape, any other physical medium with patterns of holes, a random access memory (RAM), a programmable read only memory (PROM), an erasable programmable read only memory (EPROM), an electrically erasable programmable read only memory (EEPROM), a flash memory, any other memory chip or cartridge, or any other medium from which a computer can read.

The computer programs that implement the methods and algorithms disclosed herein may be stored and transmitted using a variety of media, for example, the computer readable media in a number of manners. In an embodiment, hardwired circuitry or custom hardware may be used in place of, or in combination with, software instructions for implementation of the processes of various embodiments. Therefore, the embodiments are not limited to any specific combination of hardware and software. In general, the computer program codes comprising computer executable instructions may be implemented in any programming language. Some examples of programming languages that can be used comprise C, C++, C#, Java®, Fortran, Ruby, Pascal, Perl®, Python®, Visual Basic®, MATLAB®, etc. Other object-oriented, functional, scripting, and/or logical programming languages may also be used. The computer program codes or software programs may be stored on or in one or more mediums as object code. Various aspects of the method and the system disclosed herein may be implemented in a non-programmed environment comprising documents created, for example, in a hypertext markup language (HTML), an extensible markup language (XML), or other format that render aspects of a graphical user interface (GUI) or perform other functions, when viewed in a visual area or a window of a browser program. Various aspects of the method and the system disclosed herein may be implemented as programmed elements, or non-programmed elements, or any suitable combination thereof. The computer program product disclosed herein comprises computer executable instructions embodied in a non-transitory computer readable storage medium, wherein the computer program product comprises one or more computer program codes for implementing the processes of various embodiments.

The present invention can be configured to work in a network environment including a computer that is in communication with one or more devices via a communication network. The computer may communicate with the devices directly or indirectly, via a wired medium or a wireless medium such as the Internet, a local area network (LAN), a wide area network (WAN) or the Ethernet, token ring, or via any appropriate communications means or combination of communications means. Each of the devices may comprise computers such as those based on the Intel® processors, AMD® processors, UltraSPARC® processors, IBM® processors, etc., that are adapted to communicate with the computer. In an embodiment, the computer is equipped with a network communication device such as a network interface card, a modem, or other network connection device suitable for connecting to a network. The computer executes an operating system, for example, the Linux® operating system, the Unix® operating system, any version of the Microsoft® Windows® operating system, the Mac OS of Apple Inc., the IBM® OS/2, or any other operating system. Handheld devices execute operating systems, for example, the Android operating system, the Windows Phone™ operating system of Microsoft Corporation, the BlackBerry® operating system of Research in Motion Limited, the iOS operating system of Apple Inc., the Symbian® operating system of Symbian Foundation Limited, etc. While the operating system may differ depending on the type of computer, the operating system will continue to provide the appropriate communications protocols to establish communications links with the network. Any number and type of machines may be in communication with the computer.

The present invention is not limited to a particular computer system platform, processor, operating system, or network. One or more aspects of the present invention may be distributed among one or more computer systems, for example, servers configured to provide one or more services to one or more client computers, or to perform a complete task in a distributed system. For example, one or more aspects of the present invention may be performed on a client-server system that comprises components distributed among one or more server systems that perform multiple functions according to various embodiments. These components comprise, for example, executable, intermediate, or interpreted code, which communicate over a network using a communication protocol. The present invention is not limited to be executable on any particular system or group of systems, and is not limited to any particular distributed architecture, network, or communication protocol.

The foregoing examples have been provided merely for the purpose of explanation and are in no way to be construed as limiting of the present invention disclosed herein. While the invention has been described with reference to various embodiments, it is understood that the words, which have been used herein, are words of description and illustration, rather than words of limitation. Further, although the invention has been described herein with reference to particular means, materials, and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may affect numerous modifications thereto and changes may be made without departing from the scope and spirit of the invention in its aspects.

We claim:

1. A method for transmitting early media notifications of one or more of a plurality of communication services in more than one transmission modes to a calling party device, comprising:
   providing a multi-modal early media application executable by at least one processor configured to manage said transmission of said early media notifications of said one or more of said communication services in more than one of said transmission modes to said calling party device;
   detecting reception of a call attempt from said calling party device to contact a called party device by one of a network component, said calling party device, said called party device, and any combination thereof;
   transmitting said early media notifications of said one or more of said communication services in more than one of said transmission modes to said calling party device by said multi-modal early media application via a network, wherein said early media notifications transmitted by more than one of said transmission modes request same action from said calling party;
   prompting an action from a calling party by said multi-modal early media application during said rendering of said early media notifications of said one or more of said communication services in more than one of said transmission modes on one or more modal interfaces of said calling party device, wherein said prompting said action from said calling party is performed without billing said calling party device; and
   performing one of:
      triggering billing of said calling party device by said multi-modal early media application for said one or more of said communication services after a lapse of a configurable time period after said rendering of said early media notifications, when said calling party performs said action after said lapse of said configurable time period using said calling party device; and not triggering billing of said calling party device by said multi-modal early media application for said one or more of said communication services, when said calling party performs said action within said lapse of said configurable time period using said calling party device.

2. The method of claim 1, wherein said multi-modal early media application is deployed in one of said network component, an early media platform, and a combination thereof.

3. The method of claim 1, wherein said early media notifications comprise a text message, an image, an audio message, a video message, an audiovisual message, a multimedia message, and any combination thereof.

4. The method of claim 1, further comprising detecting occurrence of one or more of a plurality of events associated with said call attempt by one of said network component, said calling party device, said called party device, and any combination thereof.

5. The method of claim 1, wherein said transmission of said early media notifications occurs via said network at a selectable time instant of occurrence of one or more of a plurality of events associated with said call attempt, wherein said selectable time instant comprises one or more of:
   detection of an incomplete call attempt, prior to redirection of said incomplete call attempt, immediately after detection of said redirection of said incomplete call attempt, after a configurable time period of said detection of said redirection of said incomplete call attempt, and a configurable time period before completion and answering of said incomplete call attempt.

6. The method of claim 1, further comprising redirecting said incomplete call attempt by one of said network component, said calling party device, said called party device, and any combination thereof to an early media platform implementing said multi-modal early media application, via said network on detecting occurrence of one or more of a plurality of events comprising one or more of: said called party device being busy, said called party device being in an out of coverage area, said called party device being unreachable, said called party device being switched off, network congestion, and said call attempt not being answered by said called party device.

7. The method of claim 6, wherein said multi-modal early media application is configured to transmit said early media notifications of said one or more of said communication services in more than one of said transmission modes to said calling party device based on one of immediately after detection of said redirection of said incomplete call attempt by one of said network component, said calling party device, said called party device, and any combination thereof to said early media platform implementing said multi-modal early media application, and after a configurable time period after said detection of said redirection of said incomplete call attempt.

8. The method of claim 1, wherein said transmission of said early media notifications of said one or more of said communication services in more than one of said transmission modes to said calling party device allows a calling party to one or more of listen, feel, sense, and view said one or more of said early media notifications on one or more modal interfaces of said calling party device.

9. The method of claim 1, further comprising:
answering said call attempt by said multi-modal early media application to trigger billing of said calling party device; and releasing said call attempt by said multi-modal early media application to preclude said billing of said calling party device.

10. The method of claim 1, wherein said communication services comprise enabling completion of said incomplete call attempt, enabling completion of said redirected incomplete call, initiating a call for action, providing one or more of call information, commercial information, service information, and promotional information to said calling party device, transmitting advertisements to said calling party device, providing options for purchasing one or more services by performing an action on said calling party device, and any combination thereof.

11. The method of claim 1, wherein said network component is one of a first network component associated with said calling party device and a second network component associated with said called party device, wherein said second network component is one of said first network component and one of a plurality of network components excluding said first network component.

12. A method for transmitting early media notifications of one or more of a plurality of communication services in more than one transmission modes to a calling party device, comprising:
   providing a multi-modal early media application executable by at least one processor configured to manage said transmission of said early media notifications of said one or more of said communication services in more than one of said transmission modes to said calling party device;
   detecting reception of a call attempt by from said calling party device to contact a called party device by one of a network component, said calling party device, said called party device, and any combination thereof;
   transmitting said early media notifications of said one or more of said communication services in more than one of said transmission modes to said calling party device by said multi-modal early media application via a network, at any time instant of said redirected call attempt, wherein said early media notifications transmitted by more than one of said transmission modes request same action from said calling party;
   prompting an action from a calling party by said multi-modal early media application during said rendering of said early media notifications of said one or more of said communication services in more than one of said transmission modes on one or more modal interfaces of said calling party device, wherein said prompting said action from said calling party is performed without billing said calling party device; and
   performing one of:
      triggering billing of said calling party device by said multi-modal early media application for said one or more of said communication services, when an action is performed by said calling party, before lapse of a configurable time period, using said calling party device;
      triggering billing of said calling party device by said multi-modal early media application for said one or more of said communication services after a lapse of a configurable time period after said rendering of said early media notifications, when no action is performed by said calling party even after said lapse of said configurable time period using said calling party device; and not triggering billing of said calling party device by said multi-modal early media application for said one or more of said communication services, if said calling party hangs-up within said configurable time period.

13. The method of claim 12, wherein said multi-modal early media application is deployed in one of said network component, an early media platform, and a combination thereof.

14. The method of claim 12, wherein said early media notifications comprise a text message, an image, an audio message, a video message, an audiovisual message, a multimedia message, and any combination thereof.

15. The method of claim 12, wherein said transmission of said early media notifications of said one or more of said communication services in more than one of said transmission modes to said calling party device are transmitted by said multi-modal early media application via said network at a selectable time instant associated with said call attempt, wherein said selectable time instant comprises one or more of: detection of an incomplete call attempt, immediately after said detection of said incomplete call attempt, prior to said redirection of said incomplete call attempt, immediately after detection of said redirection of said incomplete call attempt, after a configurable time period after said detection of said redirection of said incomplete call attempt, and a configurable time period before completion and answering of said incomplete call attempt.

16. The method of claim 12, further comprising detecting occurrence of one or more of a plurality of events associated with said incomplete call attempt by one of said network component, said calling party device, said called party device, and any combination thereof, wherein said incomplete call attempt is redirected to said multi-modal early media application on said detection of said occurrence of said one or more of said events comprising one or more of: said called party device being busy, said called party device being in an out of coverage area, said called party device being unreachable, said called party device being switched off, network congestion, and said call attempt not being answered by said called party device.

17. The method of claim 12, wherein said communication services comprise enabling completion of said incomplete call attempt, enabling completion of said redirected incomplete call attempt, initiating a call for action, providing one or more of call information, commercial information, service information, and promotional information to said calling party device, transmitting advertisements to said calling party device, providing options for purchasing one or more services by performing an action on said calling party device, and any combination thereof.

18. A system for transmitting early media notifications of one or more of a plurality of communication services in more than one transmission modes to a calling party device, comprising:

at least one processor;

a non-transitory computer readable storage medium communicatively coupled to said at least one processor, said non-transitory computer readable storage medium configured to store a multi-modal early media application, said at least one processor configured to execute said multi-modal early media application;

said multi-modal early media application comprising an early media notification module configured to transmit said early media notifications of said one or more of said communication services in more than one of said transmission modes to said calling party device via a network, wherein said early media notifications transmitted by more than one of said transmission modes request same action from a calling party;

a multi-modal interaction module configured to transmit a prompt to said calling party device, wherein said prompt requests an action from said calling party during rendering of said early media notifications of said one or more of said communication services in more than one of said transmission modes on one or more modal interfaces of said calling party device; and a billing module configured to trigger billing of said calling party device for said one or more of said communication services after a lapse of a configurable time period after said rendering of said early media notifications, wherein said billing is triggered in response to one of:

an action being performed by said calling party after said lapse of said configurable time period using said calling party device; and no action is performed by said calling party, using said calling party device, even after said lapse of said configurable time period.

19. The system of claim 18, wherein said multi-modal early media application is deployed in one of a network component, an early media platform, and a combination thereof.

20. The system of claim 18, wherein said early media notifications comprise a text message, an image, an audio message, a video message, an audiovisual message, a multimedia message, and any combination thereof.

21. The system of claim 18, wherein one of a network component, said calling party device, a called party device, and any combination thereof is configured to detect occurrence of one or more of a plurality of events associated with a call attempt made by said calling party device to contact said called party device.

22. The system of claim 18, wherein said multi-modal early media application further comprises a detection module configured to detect one of an action and a non-action performed on said calling party device in response to said one or more of said communication services during a rendering of said early media notifications of said one or more of said communication services in more than one of said transmission modes on one or more modal interfaces of said calling party device.

23. The system of claim 18, wherein said multi-modal early media application further comprises a time selection module configured to select a time instant of occurrence of one or more of a plurality of events associated with a call attempt made by said calling party device to contact a called party device, wherein said time instant comprises one or more of:

detection of an incomplete call attempt, immediately after detection of said incomplete call attempt, a redirection of said incomplete call attempt, prior to redirection of said incomplete call attempt, immediately after detection of said redirection of said incomplete call attempt, after a configurable time period after said detection of said redirection of said incomplete call attempt, and a configurable time period before completion and answering of said incomplete call attempt.

24. The system of claim 18, wherein said billing module is configured to bill said calling party device based on one of said action and said non-action performed on said calling party device at a selectable time instant of a rendering of said early media notifications of said one or more of said communication services in more than one of said transmission modes on one or more modal interfaces of said calling party device, wherein said selectable time instant comprises one or more of: during said rendering of said early media notifications of said one or more of said communication services in more than one of said transmission modes on said one or more modal interfaces of said calling party device and after a lapse of a configurable time period after said rendering of said early media notifications of said one or more of said communication services in more than one of said transmission modes on said one or more modal interfaces of said calling party device.

25. The system of claim 18, further comprising a network component configured to redirect an incomplete call attempt made by said calling party device to a called party device, to an early media platform implementing said multi-modal early media application, via said network on detection of occurrence of one or more of a plurality of events comprising one or more of: said called party device being busy, said called party device being in an out of coverage area, said called party device being unreachable, said called party device being switched off, network congestion, and said call attempt not being answered by said called party device.

26. The system of claim 25, wherein said early media notification module of said multi-modal early media application is further configured to transmit said early media notifications of said one or more of said communication services in more than one of said transmission modes to said calling party device on one of an immediate detection of said redirection of said incomplete call attempt by said network component to said early media platform implementing said multi-modal early media application and after a configurable time period of said detection of said redirection of said incomplete call attempt.

27. The system of claim 18, wherein said multi-modal early media application further comprises a call management module configured to answer a call attempt made by said calling party device to contact a called party device, to trigger billing of said calling party device, and wherein said call management module is further configured to release said call attempt to preclude said billing of said calling party device.

28. The system of claim 18, wherein said billing module is further configured to not trigger billing of said calling party device in response to one of:
said calling party device performing said action within said configurable time period of said rendering of said early media notifications; and
said calling party hanging-up within said configurable time period.

29. The system of claim 18, wherein said communication services comprise enabling completion of an incomplete call attempt made by said calling party device to a called party device, enabling completion of a redirected incomplete call attempt, initiating a call for action, providing one or more of call information, commercial information, service information, and promotional information to said calling party device, transmitting advertisements to said calling party device, providing options for purchasing one or more services by performing an action on said calling party device, and any combination thereof.

* * * * *